United States Patent [19]

Hasegawa et al.

[11] Patent Number: 5,353,642
[45] Date of Patent: Oct. 11, 1994

[54] CENTRIFUGAL TYPE ACCELERATION MEASURING DEVICE

[75] Inventors: Osamu Hasegawa; Hisashi Andoh; Kohichi Satoh; Youji Miura; Keinosuke Shirota, all of Chofu, Japan

[73] Assignee: Kyowa Electronic Instruments, Ltd., Tokyo, Japan

[21] Appl. No.: 827,167

[22] Filed: Jan. 28, 1992

[30] Foreign Application Priority Data

Feb. 1, 1991 [JP] Japan .................. 3-032249
Feb. 12, 1991 [JP] Japan .................. 3-039033

[51] Int. Cl.$^5$ .................. G01P 3/16; G01P 15/02
[52] U.S. Cl. .................. 73/535; 73/577 R; 73/1 D
[58] Field of Search ......... 73/535, 1 D, 1 DC, 517 R; 494/1, 10

[56] References Cited

U.S. PATENT DOCUMENTS

| | | | |
|---|---|---|---|
| 2,788,654 | 4/1957 | Wiancko | 73/1 DC |
| 3,267,768 | 8/1966 | Drone et al. | 73/1 DC |
| 3,372,572 | 3/1968 | Campbell | 73/1 DC |
| 4,188,816 | 2/1980 | Mairson | 73/1 D |
| 4,202,205 | 5/1980 | Carpenter | 73/1 D |
| 4,848,158 | 7/1989 | Egli | 73/535 |

Primary Examiner—Hezron E. Williams
Assistant Examiner—Helen C. Kwok
Attorney, Agent, or Firm—Lane, Aitken & McCann

[57] ABSTRACT

An acceleration measuring system wherein acceleration transducers are mounted on a turntable supported by an air bearing and directly driven by a brushless motor. The output signals generated by the acceleration transducers are amplified by amplifiers mounted on the turntable and the output signals are converted to digital signals by an analog-to-digital converter also mounted on the turntable. The digital signals are modulated into AC signals by a modulator also mounted on the table and then transmitted to a demodulator on a fixed portion of the system through a rotary transformer. The output of the demodulator representing the acceleration signal is applied to digital-to-analog converters and also to a binary coded decimal converter. In an alternative embodiment, the acceleration transducers are mounted on individual separate turntables which in turn are mounted on a primary turntable. The individual turntables are each separately and individually driven by brushless motors and the primary turntable is also directly driven by a brushless motor.

4 Claims, 11 Drawing Sheets

CENTRIFUGAL TYPE ACCELERATION MEASURING DEVICE

BACKGROUND OF THE INVENTION

1. Field of the Invention

This invention relates to a centrifugal type acceleration measuring device, and more particularly a centrifugal type acceleration measuring device in which a turn-table having a measured acceleration transducer mounted thereon is rotationally driven by a motor to apply an acceleration to the acceleration transducer, an output of the acceleration transducer is properly processed for its signal and then the signal is transmitted to a fixed part to perform a measurement of the acceleration in a highly accurate manner.

2. Description of the Related Art

A centrifugal type acceleration measuring device in the prior art is operated such that a turn-table is rotated in a horizontal plane, a measured acceleration transducer (hereinafter called as "an acceleration transducer") is fixed to an outer circumference of the turn-table, the turn-table is rotated, a centrifugal acceleration is given to the acceleration transducer on the turn-table, an output characteristics at this time is inspected and measured.

In such a centrifugal type acceleration measuring device as described above, an induction electric motor is used as a motor for rotationally driving the turn-table, its rotating power is transmitted through a belt, a multi-stage gear box and a clutch or the like and in case of stopping the rotation of the turn-table, a braking action is applied to the motor through a brake.

In addition, a control over the rate of rotation of the motor is also carried out under an open-loop system.

In turn, rotational supporting of the turn-table is also carried out mechanically by a ball bearing.

As the turn-table is rotated, the acceleration transducer detects a centrifugal acceleration. This detected output is transmitted to a measuring system through a signal transmitting system. In this signal transmitting system, an analogue transmitting system performed by means of mechanical contact between a slip ring and a brush due to the fact that the turn-table is being rotated and the measuring system is mounted at a stationary location.

The detected output passed through this transmitting system is inputted into the measuring system in its analogue signal form and converted into a digital signal; thereafter the converted signal passes through an input-/output circuit and is inputted to a central processing unit (hereinafter called as "CPU").

After a predetermined analyzing process is carried out at the CPU, a result of analyzing action is displayed at a display device or printed out in a printer.

In addition, electrical power is normally supplied the acceleration transducer disposed on the turn-table through a slip-ring system.

In view of the foregoing, as a calibration method for the acceleration transducer, a comparing calibration system and an absolute calibration system are employed by an official in inspection organization.

The comparing calibration system is operated such that a reference acceleration transducer and a calibrated acceleration transducer are integrally fixed on the same reciprocating vibrator device so as to apply a vibration and the calibrated acceleration transducer is calibrated at a vibration acceleration calculated in response to an output from the reference acceleration transducer.

In addition, the aforesaid absolute calibration system is operated such that a calibrated acceleration transducer is fixed on a reciprocating type vibrator so as to apply a vibration, a displacement amplitude at that vibration is accurately measured by a laser interferometer, a vibration acceleration or the like is calculated in reference to a vibration frequency (number of vibration oscillations per unit time) and then the calculated acceleration is applied as a reference acceleration.

As an additional calibration method of the acceleration transducer, the aforesaid centrifugal type is proposed and this process is not officially acknowledged as a calibration method.

In the prior art centrifugal type acceleration measuring device, at first, an induction motor or the like is used in the rotary driving system for the turn-table, resulting in that a sliding noise of the brush may occur and has a disadvantage that it is mixed in the detected output. In addition, driving transmission is carried out through a belt, a multi-stage gear box and a clutch or the like, resulting in that its size is increased, its vibration is added to the turn-table and then an accurate acceleration is hardly given to the acceleration transducer.

In addition, since the transmitting system for the detected output is also constructed as a mechanical analogue type transmitting system having a slip-ring or a brush, it is not avoidable to have frictional wear at the sliding part, poor contact at the sliding part and overlapping of noise accompanied by the contact on the detected output.

Further, supplying of an electrical power to the measuring system is also carried out by means of sliding system using the slip-ring or a brush, so that its wear is not avoidable.

In turn, in the case the of the acceleration measuring device of the aforesaid comparing type, it has a disadvantage that its calibration accuracy is 2% within a frequency range of 0.5 Hz to 5 KHz and it shows a quite low value of 5% within a frequency range of 5 Hz to 10 KHz.

In addition, the aforesaid absolute calibration system acceleration measuring device has a disadvantage that its calibration accuracy is a high value of about 1% within a frequency range of 20 Hz to 5 KHz and its use can not be carried out at a frequency range of lower than 20 Hz and a desired accuracy may not be satisfactory.

That is, as the device for calibrating the value, it is desirable that its accuracy is high, but in view of its mechanical configuration and a circuit configuration, there is a certain limitation. At present, since an accuracy less than 0.5% is required, it must be said that the aforesaid comparing calibration system measuring device is not adopted as a calibrating device and in turn, in the case of the absolute calibration system measuring device, although this is adopted in a frequency range of 20 Hz to 5 KHz of the calibrating device, a configuration of the calibration system requires a vibrator; a synthesizer and a power amplifier for driving the vibrator; a laser generating device, two fixed mirrors, one vibrating mirror, one beam splitter, an opto-electrical converter, a counter, a filter, a voltmeter for use in detecting a displacement amplitude of vibration; a load amplifier and a voltmeter for measuring an output from a calibrated acceleration transducer; and a computer for controlling in drive of these systems as well as for its calculation and a displaying control or the like, so that it becomes quite complex, large in size and it is expensive and further it has a disadvantage that its measuring operation is complex.

In addition, this absolute calibration system device also has a fatal disadvantage for calibration at a frequency range of 20 Hz or less and 5 KHz or more.

SUMMARY OF THE INVENTION

This invention has been completed in view of the foregoing circumstances, and it is an object of the present invention to provide a centrifugal type acceleration measuring device in which a useless vibration is not generated at or given to the turn-table and so a predetermined acceleration can be accurately given to the measured acceleration transducer.

It is another object of the present invention to provide a centrifugal type acceleration measuring device in which a detected output of a rotating acceleration transducer can be accurately transmitted to a fixed side without generating any noise in the signal transmitting system when the output is transmitted to the fixed side.

It is a still further object of the present invention to provide a centrifugal type acceleration measuring device in which a measured acceleration transducer can perform not only a static acceleration measurement but also a dynamic acceleration measurement (a calibration) and further a high precision measurement at a wide frequency range including a low frequency of 0 to 20 Hz which is assumed to be impossible in the prior art and its configuration is simple and its operation is also facilitated.

The invention is characterized in that there are provided a turn-table directly driven by a brushless motor and having an acceleration transducer mounting part for use in fixing the measured acceleration transducer formed at a location displaced from a center of rotation, an air bearing for rotatably supporting the turn-table, a stored amplifier for respectively amplifying an output of the acceleration transducer fixed to the acceleration transducer mounting part of the turn-table and a rotary transformer for transmitting each of signals outputted from the stored amplifier to the fixed side in order to accomplish the aforesaid first and second objects, wherein the rate of revolution of the brushless motor is varied to apply a predetermined acceleration to the measured acceleration transducer and an output from the measured acceleration transducer is fed out to the fixed side through the rotary transformer.

The invention is further is characterized in that there are provided a turn-table directly driven by a brushless motor and having an acceleration transducer mounting part for fixing the measured acceleration transducer displaced from a center of rotation, an air bearing for rotatably supporting the turn-table, a signal adjusting means for amplifying at least an output from the acceleration transducer mounting part, the first signal processing means for performing a modulation after converting a parallel signal having a signal outputted from the signal adjusting means digitally converted into a serial signal, a rotary transformer rotated together with the measured acceleration transducer and transmitting an output of the first signal processing means from the rotary side to the fixed side and the second signal processing means for demodulating a signal transmitted to the fixed side of the rotary transformer and converting it into the serial signal in order to accomplish the aforesaid first and second objects.

In addition, the invention is further characterized in that there are provided a turn-table directly driven by a brushless motor and having an acceleration transducer mounting part for fixing the measured acceleration transducer formed at a location displaced from a center of rotation, an air bearing for rotatably supporting the turn-table, a signal adjusting means having the function to receive a detected output of the acceleration transducer fixed to the acceleration transducer mounting part of the turn-table and amplify it, the function for outputting a calibration value signal and the function for removing a non-balanced component of a bridge circuit, the first signal processing means for performing a demodulating process after converting a parallel signal converted in a digital form outputted from the signal adjusting means into a serial signal, a rotary transformer rotated together with the measured item and for transmitting an output of the first signal processing means from the rotary part to the fixed part, the second signal processing means for demodulating a signal transmitted to the fixed side of the rotary transformer and converting it into a serial signal, an instruction signal generating means for producing instruction signals such as the calibration value signal outputting instruction for use in controlling the signal adjusting means and a balance adjusting instruction in the bridge circuit or the like, the third signal processing means for modulating a parallel instruction signal outputted from the instruction signal generating means after its conversion into a serial instruction signal, a changing-over means for transmitting an output signal of the first signal processing means under no occurrence of the instruction signal to the second signal processing means through the rotary transformer, preventing a transmittance of an output signal of the first signal processing means toward the second signal processing means and transmitting an output signal of the third signal processing means from the fixed part of the rotary transformer toward the rotating part, and the fourth signal processing means for demodulating an output signal of the third signal processing means transmitted from the fixed part of the rotary transformer toward the rotary part, converting it in parallel and outputting it to the signal adjusting means so as to accomplish similarly the first and second objects.

The invention is further is characterized in that there are provided the first turn-table directly connected to and rotationally driven by the first brushless motor and having an acceleration transducer mounting part for fixing the measured acceleration transducer so as to cause a center of sensing part of the measured acceleration transducer to become a center of rotation, the first bearing for rotationally supporting the first turn-table, the second turn-table directly connected to and rotationally driven by the second brushless motor and having the first turn-table disposed at a location displaced from a center of rotation through the first bearing, the second bearing of an air bearing for rotationally supporting the second turn-table, a stored amplifier for individually amplifying an output of the acceleration transducer fixed to the acceleration transducer mounting part of the first turn-table, the first rotary transformer for transmitting a signal outputted from the stored amplifier toward the second turn-table, and the second rotary transformer for transmitting a transmitting signal of the first rotary transformer from the second turn-table to the fixed part so as to accomplish the first, second and third objects, wherein the rate of revolution of the second brushless motor is varied to apply a predetermined acceleration to the first turn-table, the first brushless motor is rotated to cause the sensing shaft to be rotated around the sensing part of the measured acceleration transducer mounted on the first turn-table so as to apply a frequency modulating component and the output of the measured acceleration transducer is fed out to the fixed part in sequence through the first and second rotary transformers.

The centrifugal type acceleration measuring device made as described above is operated such that the turn-table is directly driven by the brushless motor and the rotated turn-table is rotatably supported by the air bearing in a non-contacted state, so that a non-required vibration is not added to the turn-table.

A plurality of acceleration transducers are arranged at the turn-table detect each of the accelerations accompanied by the rotation of the turn-table in the horizontal direction, the detected outputs are applied to their respective stored amplifiers, and each of the stored amplifiers properly amplifies the detected outputs and converts them into digital signals as required.

The rotary transformer arranged at the rotary part transmits the converted outputs to the measuring system disposed at the location of the fixed part other than the turn-table.

Action for transmitting the detected output of the measured acceleration transducer to the fixed part will be described more practically, wherein the detected output is properly amplified by a signal adjusting means and then transmitted to the first signal processing means. The first signal processing means converts the amplified detected output into a digital signal, thereafter converts a serial signal into a parallel signal, modulates the parallel signal and inputs it into the rotary transformer rotating together with the measured item. The rotary transformer transmits the detected output from its rotary part to the fixed part.

The second signal processing means demodulates the signal transmitted from the rotary part of the rotary transformer to the fixed part, converts the parallel signal into the serial signal and takes out a signal corresponding to the acceleration detected by the acceleration transducer at the fixed part.

The changing-over means of the acceleration measuring device constructed as described above transmits an output signal of the first signal processing means to the signal processing means (at the fixed side) through the rotary transformer when an instruction signal is not transmitted from the fixed side of the rotary transformer rotationally driven by the brushless motor or the like to the signal adjusting means.

In addition, if a predetermined instruction signal is sent from the instruction signal generating means at the fixed part to the third signal processing means, the changing-over means prevents the output signal of the first signal processing means from being transmitted from the rotary part of the rotary transformer to the fixed part and changes over to transmit the instruction signal from the fixed part of the rotary transformer to the rotary part.

The third signal processing means converts the instruction signal of the parallel signal into the serial signal and then modulates it, outputs it to the rotary transformer. The fourth signal processing means demodulates an instruction signal sent from the fixed part of the rotary transformer to the fixed part converts the serial signal into the parallel signal and outputs it to the signal adjusting means.

Although the foregoing is caused by a static measurement (a calibration) of the centrifugal acceleration measuring device, the turn-table is of a two-stage configuration so as to enable its dynamic measurement (a calibration) to be carried out and this is realized by the foregoing system.

That is, the first turn-table of small-size is rotatably supported at a location displaced by a specified distance from the center of rotation of the second turn-table of large size through the first bearing, and the turn-tables are rotated by the first and second brushless motors directly connected under a condition in which the second turn-table is rotatably supported at the fixed part through the air bearing. Then, the measured acceleration sensor mounted on the first turn-table while a center of the sensing part coincides with a center of rotation of the first turn-table and receives a specified centrifugal force corresponding to the eccentric distance and the rate of revolution of the second turn-table.

At this time, the measured acceleration transducer is operated such that when its sensing shaft coincides with a radiation axis of the second turn-table and a positive direction of the sensing shaft is directed toward the center of rotation, a positive sensing output corresponding to the centrifugal acceleration is attained; when a positive direction of the sensing shaft is directed in a direction opposite to the center of rotation, a negative sensing output is attained, and when the sensing shaft is displaced from 0° to 90° with respect to the radiation axis of the second turn-table, the sensing output is varied from the maximum value to 0; when the sensing shaft is displaced from 90° to 180°, the sensing output is varied from 0 to the negative maximum value; and when the sensing shaft is displaced form 180° to 270° and from 270° to 360°, the sensing output is varied from the negative maximum value to 0 and from 0 to the positive maximum value.

Accordingly, the first turn-table is rotated at any rate of revolution to enable an alternative output corresponding to the rate of revolution to be attained from the measured acceleration transducer mounted on the first turn-table, resulting in that a dynamic measurement of the acceleration (a calibration) can be carried out over a wide range of frequency.

As described above in detail, the turn-tables are directly driven by the brushless motor, so that at first, the clutch or the gear reducer mechanism is eliminated, an entire device of small size can be realized, the occurrence of noise is restricted to cause the multi-stage setting of the acceleration to be facilitated and an automatic programmed acceleration measurement can be realized.

In addition, since rotational supporting of the turn-tables are carried out under a non-contact state with an air bearing, a high precision rotational supporting can be realized for both thrust and radial directions and further no noise is produced, the S/N ratio is high and their a high precision acceleration measurement can be carried out.

Further, since an output of the acceleration detection of each of the acceleration transducers is amplified by the stored amplifier, thereafter the output is transmitted through the rotary transformer, a non-contact state is maintained and the occurrence of noise can be restricted in the same manner as described above and at the same time it is possible to provide a centrifugal type acceleration measuring device having no mechanical wearing part and eliminating any maintenance work and thus its range of application as a calibration device acting as a reference of occurrence of the acceleration.

According to the invention, it is possible to provide a centrifugal type acceleration measuring device in which a calibration operation or an automatic balancing or the like can be remotely controlled at the fixed side for each of a plurality of signal adjusting means, a measuring operation can be efficiently carried out, resulting in that an acceleration on the turn-tables can be accurately detected.

According to the invention it is possible to provide a centrifugal type acceleration measuring device which has a higher accuracy than that of an absolute calibration system having the highest accuracy in calibration in a frequency range of 20 Hz to 5 kHz and further either a measurement or a calibration of the dynamic acceleration can be carried out over a wide frequency range including a range of 0 to 20 Hz.

DESCRIPTION OF THE PREFERRED EMBODIMENTS

Referring now to the accompanying drawings, the first preferred embodiment of the present invention will be described more practically.

Figure 1:
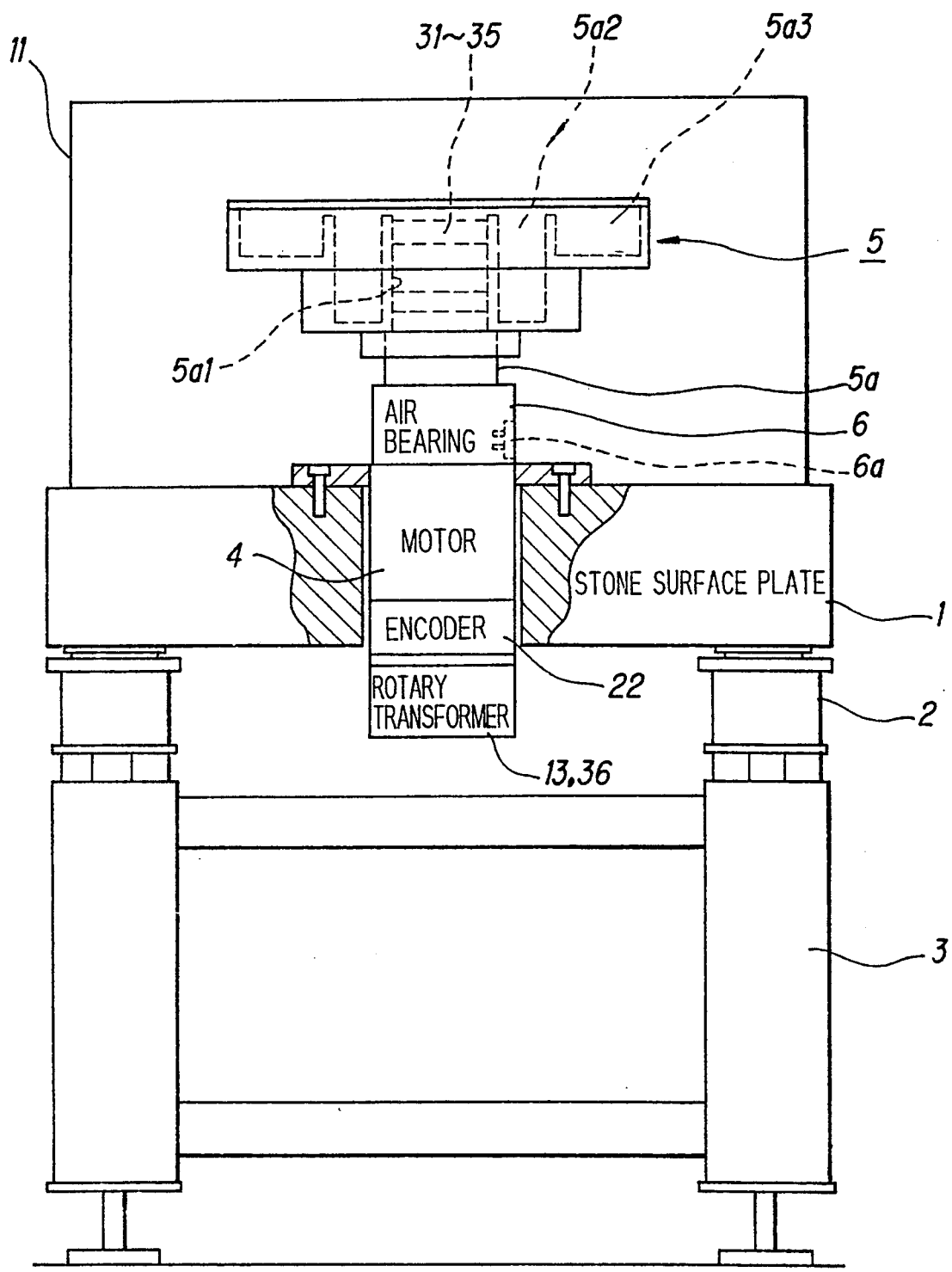
FIG. 1 is a front elevational view for showing a partly broken entire configuration of one preferred embodiment of the centrifugal type acceleration measuring device of the present invention.

FIG. 1 is a front elevational view for showing an entire configuration of a centrifugal type acceleration measuring device of the present invention.

In FIG. 1, 1 denotes a stone surface plate formed in a disk shape. A lower surface of the stone surface plate 1 is fixed to supporting columns 3 through vibration-proof devices 2 such as an oil damper or an air damper or the like. The supporting columns 3 and the vibration-proof devices 2 are plural in number (4 pieces in this example). The lower ends of the supporting columns 3 are fixed to a flat floor surface.

A through-pass motor storing part is arranged at a central part of the stone surface plate 1, and a brushless motor (hereinafter merely called as "a motor") is stored in the motor storing part. The motor 4 directly rotates a turn-table 5 with out using any belt or a gear reduction box or the like. A rotary supporting shaft 5a suspended downwardly at the lower surface at the central part of the turn-table 5 and a rotary shaft of the motor 4 are directly connected to each other.

Between the motor 4 and the turn-table 5 is placed an air bearing 6. A rotary shaft supporting part 5a of the turn-table 5 is fitted to and connected to a rotary cylinder disposed at the central part of the air bearing 6 and then the rotary cylinder is rotatably supported at the fixed cylinder under an action of pneumatic pressure.

A pneumatic pressure supplying part 6a is arranged at an outer circumferential surface of the air bearing 6. To the pneumatic pressure supplying part 6a is supplied compression air from an air cleaner 7 shown in FIG. 2; thereby the rotary cylinder having the rotary shaft supporting part 5a of the turn-table 5 fitted therein is rotatably supported in its non-contacted condition.

Figure 2:
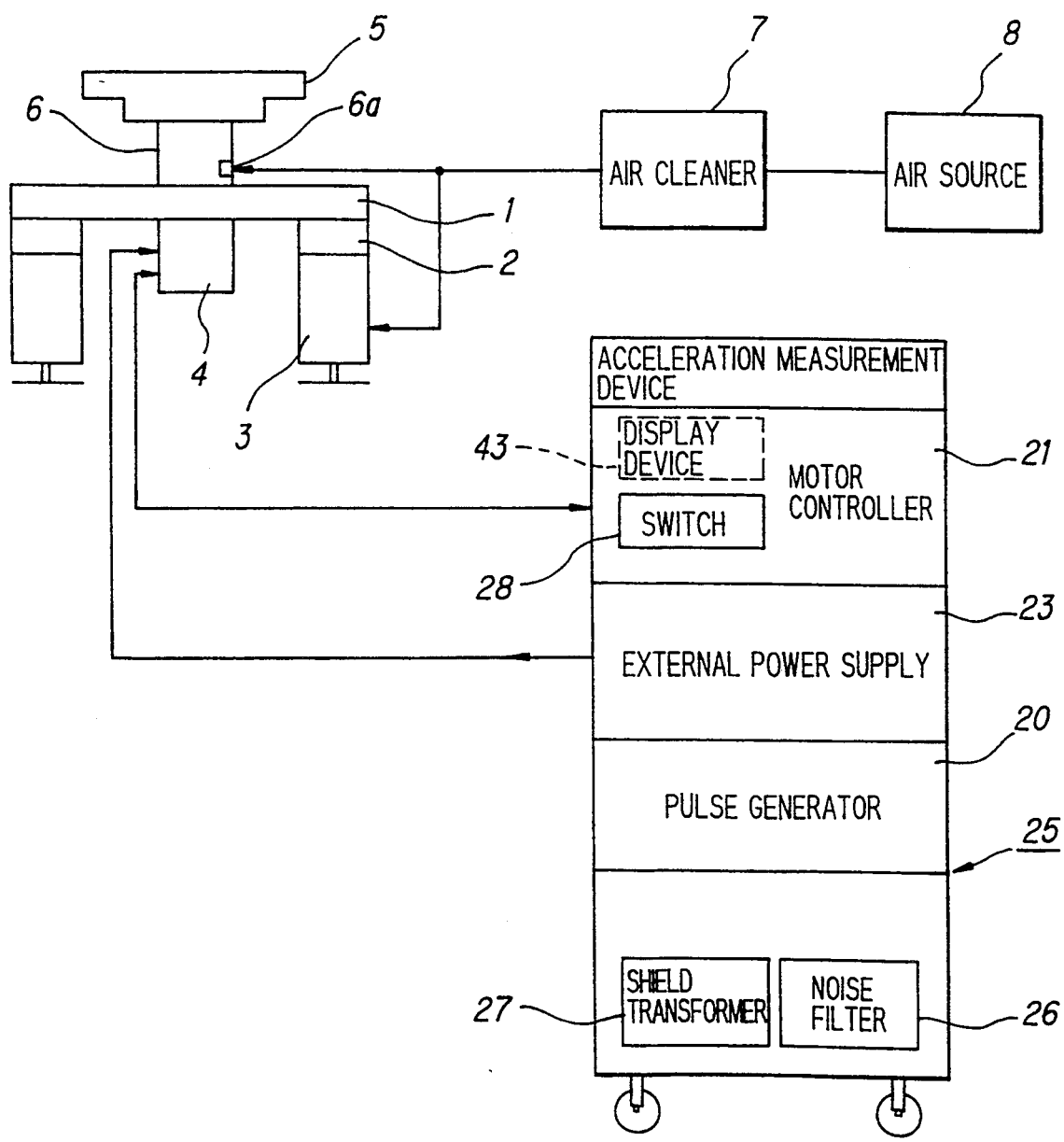
FIG. 2 is a block diagram for showing an entire schematic configuration of the preferred embodiment shown in FIG. 1.

FIG. 2 is a block diagram for schematically showing an entire configuration of the present invention.

As apparent from FIG. 2, to the air cleaner 7 is connected an air source 8. Air to be supplied from the air source 8 is adjusted in its pressure by an air regulator (not shown) (for example, adjusted to a predetermined pressure of 3 to 10 kg/cm$^2$) after dust particles or the like in the air are removed by the air cleaner 7.

The pressure adjusted air is supplied to the pneumatic pressure supplying part 6a of the aforesaid air bearing 6 and as shown in FIG. 2, the air passes the supporting columns 3 and is supplied to the vibration-proof devices 2.

Figure 3:
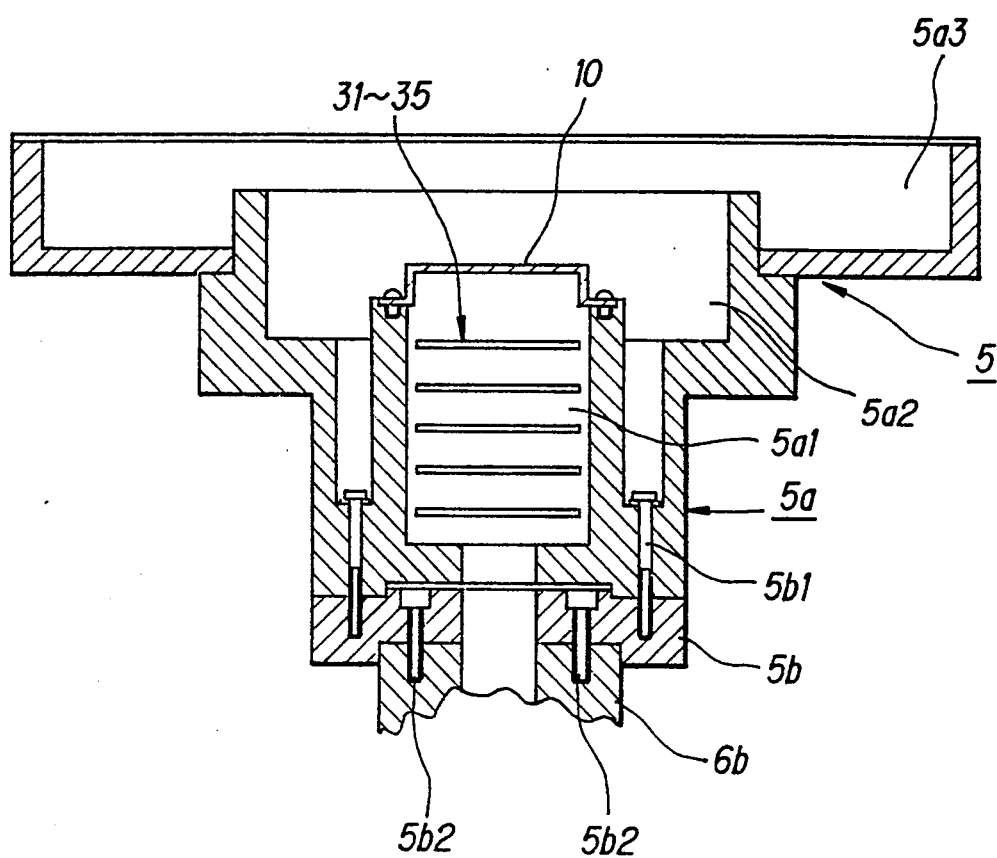
FIG. 3 is an enlarged sectional view for showing a related part between the turn-table and the air bearing of the preferred embodiment shown in FIG. 1.

Detailed configuration of the aforesaid air bearing 6 and the rotary shaft supporting part 5a of the turn-table 5 is shown in an enlarged sectional view of FIG. 3.

In FIG. 3, at the first, a configuration of the turn-table 5 will be described. The rotary shaft supporting part 5a of the turn-table 5 is formed with a hollow barrel 5a1. Within the hollow barrel are stored a multiplexer 31, a controller 32, an A/D converter 33, a P-S converter 34 and a modulator 35 or the like which are components of the stored amplifier. As to the multiplexer 31 and the controller 32 or the like, they will be described in detail in reference to FIG. 4 later. An upper end of the hollow barrel 5a1 is fixed with a cover 10 to close it.

At the upper of the rotary shaft supporting part 5a is disposed a storing part 5a2 for use in storing cord or the like. An outer circumference of the storing part 5a2 is formed with acceleration transducer mounting parts 5a3 of which diameters are larger than that of the storing part 5a2.

In this preferred embodiment, four acceleration transducer mounting parts 5a3 are formed in a short cylindrical spacing having a bottom part and equally spaced apart around a center of rotation of the turn-table 5. As shown in a block diagram of FIG. 4, the acceleration transducers 12a to 12d are stored in the four acceleration transducer storing parts 5a3 one by one and a total number of four acceleration transducers are entirely stored for the turn-table 5.

The turn-table 5 is integrally connected such that at first an annular concave groove of the connecting block 5b and an outer circumference of the rotary cylinder 6b of the air bearing 6 are fitted to each other, then a plurality of bolts 5b2 are inserted from the upper surface of the connecting block 5b at a predetermined angular spacing and threadedly engaged with the female thread holes formed in the rotary cylinder 6b.

In addition, under a condition in which the upper surface of the connecting block 5b is being abutted against the lower surface of the rotary shaft supporting part 5a of the turn-table 5, the connecting block 5b is connected to the rotary shaft supporting part 5a with a plurality of bolts 5b1 from the upper surface of the rotary shaft supporting part 5a.

With such an arrangement, the fixed shaft supporting part 5a is connected to the rotary cylinder 6b of the air bearing 6 through the connecting block 5b. The rotary cylinder 6b is rotatably supported by pneumatic air against the fixed cylinder of the air bearing 6 with a minimum clearance, resulting in that the turn-table 5 is rotatably supported in a horizontal direction against the air bearing 6.

Now, the description will be returned from FIG. 3 back to FIG. 1. As shown in FIG. 1, a safety cover 11 is fixed onto the stone surface plate 1 so as to enclose the air bearing 6 and the turn-table 5 therein.

This safety cover 11 is applied for preventing the acceleration transducer from being dispersed outwardly under a centrifugal force even if the acceleration transducer is removed from the turn-table 5 during its testing operation and for preventing an operator from touching the turn-table 5 during an operation.

Then, referring to FIGS. 2 and 4, a transmitting system and a processing system for the detected output will be described.

Figure 4:
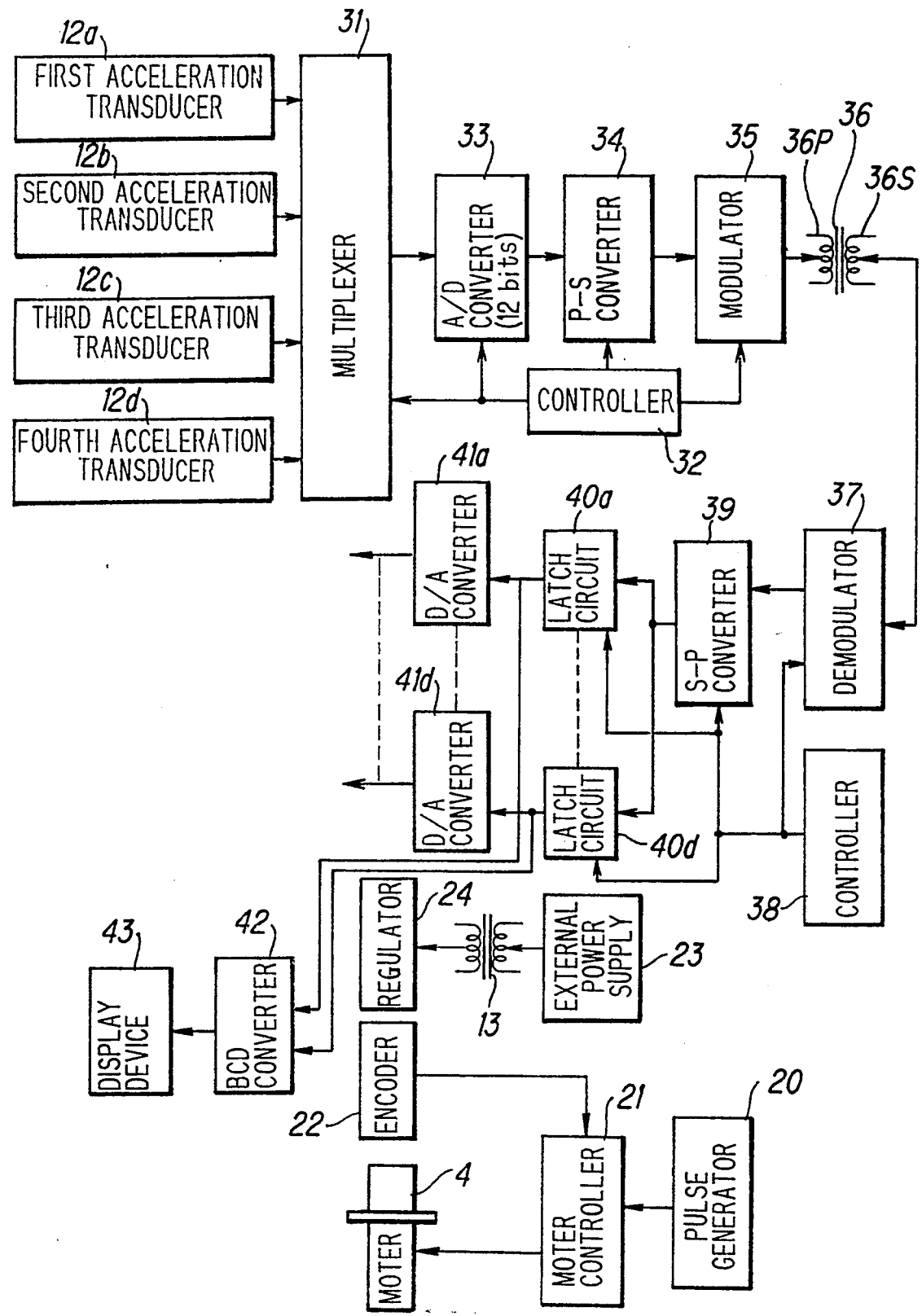
FIG. 4 is a block diagram for showing portions in a signal transmitting system and a rotary driving system of the preferred embodiment shown in FIG. 1.

As shown in FIG. 4, in this preferred embodiment, it is made such that the four acceleration transducers, i.e. the first acceleration transducer 12a to the fourth acceleration transducer 12d can be concurrently measured.

Each of these first acceleration transducer 12a to the fourth acceleration transducer 12d is stored and mounted one by one in the four acceleration transducer mounting parts 5a3 of the turn-table 5 shown in FIGS. 1 and 3.

In this preferred embodiment, these first acceleration transducer 12a to the fourth acceleration transducer 12d are strain gauge type acceleration transducers. Each of the acceleration transducers 12a to 12d is operated to detect a rotational speed of the turn-table 5, i.e. a strain corresponding to the acceleration and to get an acceleration detected output. When a rotational speed of the motor 4 is increased or decreased in a stepwise manner, an acceleration varying in a stepwise manner is enabled to be attained.

Detected outputs of the first acceleration transducer 12a to the fourth acceleration transducer 12d are inputted to the multiplexer 31 stored in the storing part 5a2.

The multiplexer 31 is operated such that the outputs of the first acceleration transducer 12a to the fourth acceleration transducer 12d are changed over individually in sequence by an output signal of the controller having a sequence counter (not shown) stored therein, that is, by inputting the data of four channels channel by channel, and then outputted to an analogue/digital (hereinafter called as "A/D") converter 33 of 12 bits.

The A/D converter 33 convert the outputs of the first acceleration transducer 12a to the fourth acceleration transducer 12d outputted from the multiplexer 31 into digital signals in response to a control signal of the controller 32 and outputs them to a parallel-serial (hereinafter called as "P-S") converter 34.

The P-S converter 34 converts the digital signal of 12 bits outputted from the A/D converter 33 into a serial signal in response to a control signal of the controller 32 and outputs it to the modulator 35.

An oscillator, although not shown, is stored in the modulator 35 and modulates a signal in response to an output signal of the controller 32 for every "1" and "0" of data inputted from the P-S converter 34 and converted into a serial signal.

In this preferred embodiment, "1" of the serial data is modulated to 2 fHz, for example, 50 KHz and "0" is modulated to fHz, for example 25 KHz so as to modulate an output signal (a pulse signal) of the oscillator and then the output signal is outputted to a primary side of the rotary transformer 36.

In FIG. 1, the rotary transformer 36 is disposed at a location below the rotary main shaft of the motor 4. In FIG. 4, a primary winding 36P and a secondary winding 36S of the rotary transformer 36 are synchronous with a rotation of the motor 4 and further electromagnetically coupled to each other.

Signals of 2 fHz and fHz corresponding to "1" and "0" induced at the secondary winding 36S of the rotary transformer 36 are inputted to the demodulator 37.

To this demodulator 37 is inputted a control signal from the controller 38. With this control signal, the demodulator 37 demodulates an induction signal of the secondary winding 36S of the rotary transformer 36 to digital measured data and outputs it to a serial-parallel (hereinafter called as "S-P") converter 39.

To this S-P conveter 39 is also inputted a control signal from the controller 38. The digital serial data outputted from the demodulator 37 is converted into a parallel data of 12 bits in response to the control signal.

The parallel data is latched to four latch circuits 40a to 40d for every channel in response to the output signal from the controller 38, that is, in correspondence with the outputs of the first acceleration transducer 12a to the fourth acceleration transducer 12d.

Each of the outputs of these four latch circuits 40a to 40d is inputted to corresponding digital/analogue (hereinafter called as "D/A") converters 41a to 41d and outputted to a binary-coded-decimal converter (hereinafter called as a "BCD converter") 42.

The BCD converter 42 is operated such that it inputs an output from each of the latch circuits 40a to 40d, converts it into a decimal number through a binary coded decimal method and outputs it to the display device 43. As the display device 43, a CRT display device or the like is preferable.

Figure 5:
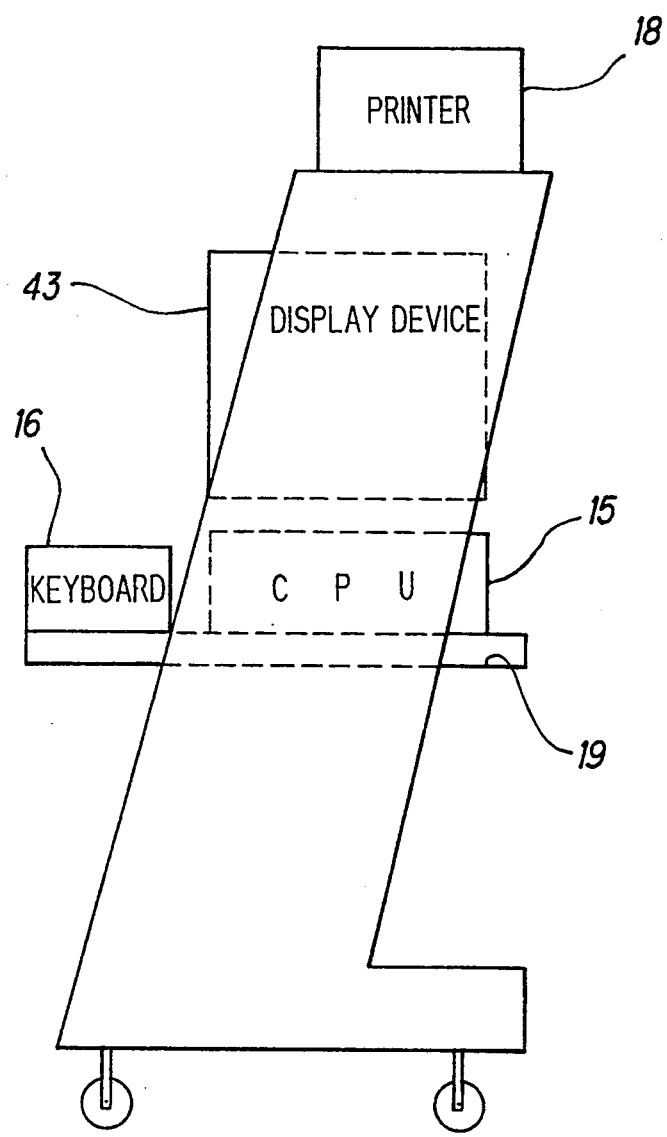
FIG. 5 is an illustrative view for showing a relation of arrangement in an analyzing processing system in the preferred embodiment shown in FIG. 1.

Although not shown in FIG. 4, an output of the S-P converter 39 may be outputted to the CPU 15 as shown in FIG. 5, a key-board 16 and a printer 18 or the like are connected to the CPU 15, acceleration detected outputs detected by the first acceleration transducer 12a to the fourth acceleration transducer 12d are analyzed by the CPU 15, various data processings are carried out under an operation of the key-board 16 by an operator, and the result of analization, i.e. the measured value data may also be printed out by a printer 18.

Each of the members in FIG. 4 ranging from the first acceleration transducer 12a to the fourth acceleration transducer 12d to the rotary transformer 36 is disposed at the rotary side and the components ranging the demodulator 37 to the display device 43 are disposed at the fixed side.

FIG. 5 illustrates one example of the arrangement of the analysis processing system, wherein the key-board 16 and the CPU 15 are arranged on a desk 19 having casters. The display device 43 illustrated in FIG. 5 is disposed above the CPU 15 and the printer 18 is mounted on a shelf.

In FIG. 4, a clock pulse from a pulse generator 20 is outputted to the motor controller 21.

To the motor controller 21 is inputted an output from the encoder 22. The encoder 22 is one for measuring the rate of revolution (a rotational angular velocity) and encoding it. The motor controller 21 may compare in phase with an output from the encoder 22 in reference to a pulse from the pulse generator 20 and control a rotational speed of the motor 4 in such a way as it becomes a predetermined set speed.

As shown in FIG. 1, this encoder 22 is disposed below the motor 4.

Reference numeral 23 denotes an external power supply set at the fixed side, wherein an output of the external power supply 23 is supplied to the regulator 24 through the rotary transformer 13. Electrical supply of the external power supply 23 to the regulator 24 can be carried out under a non-contact condition without using any slip ring or a brush through the rotary transformer 13.

The regulator 24 regulates an AC voltage supplied from the external power supply 23 to a DC voltage, thereafter supplies it as a predetermined rated voltage to the multiplexer 31 and the controller 32 or the like.

As shown in FIG. 2, the pulse generator 20, motor controller 21 and external power supply 23 or the like are assembled in the rack 25 having casters. A noise filter 26 or a shield transformer 27 or the like are stored at the bottom part of the rack 25 and the rate of revolution of the motor controller 21 can be set by changing-over operation of the switch 28.

A set rotational speed for every operation of this switch 28 is one displayed at the display device 43.

Operation of the first preferred embodiment constructed as described above will be described.

At first, electrical power is supplied from the external power supply 23 to the regulator 24 through the rotary transformer 13, the AC voltage supplied from the external power supply 23 is rectified to a DC voltage by the regulator 24, thereafter the voltage is made as a constant voltage and an operating power supply is supplied to the multiplexer 31 and the controller 32 or the like.

Under an operation of the switch 28 shown in FIG. 2, a rotational speed of the motor 4, i.e. an acceleration of it is set, thereby the set rotational speed is displayed at the display device 43.

As the motor 4 is rotated at the set rotational speed, a practical rotational speed of the motor is measured by the encoder 22 so as to encode the measured value and then an output of the encoder 22 is sent to the motor controller 21.

The motor controller 21 compares a pulse inputted from the pulse generator 20 with a phase of output of the encoder 22 and controls the rotational speed in such a way as the rate of revolution of the motor 4 may become the set rate of revolution.

This motor 4 is a brushless motor and rotationally drives the turn-table 5 directly, so that the turn-table 5 can be rotated at a high core displacement accuracy and with less jitter.

Figure 6:
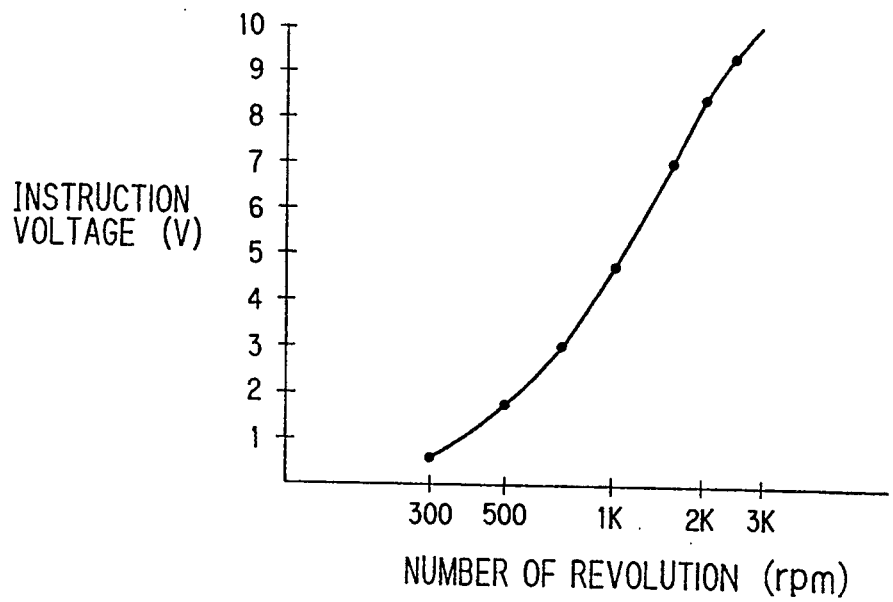
FIG. 6 is a characteristic view for showing a relation of an instruction voltage vs the number of revolution of the motor of the preferred embodiment of FIG. 1.
Figure 7:
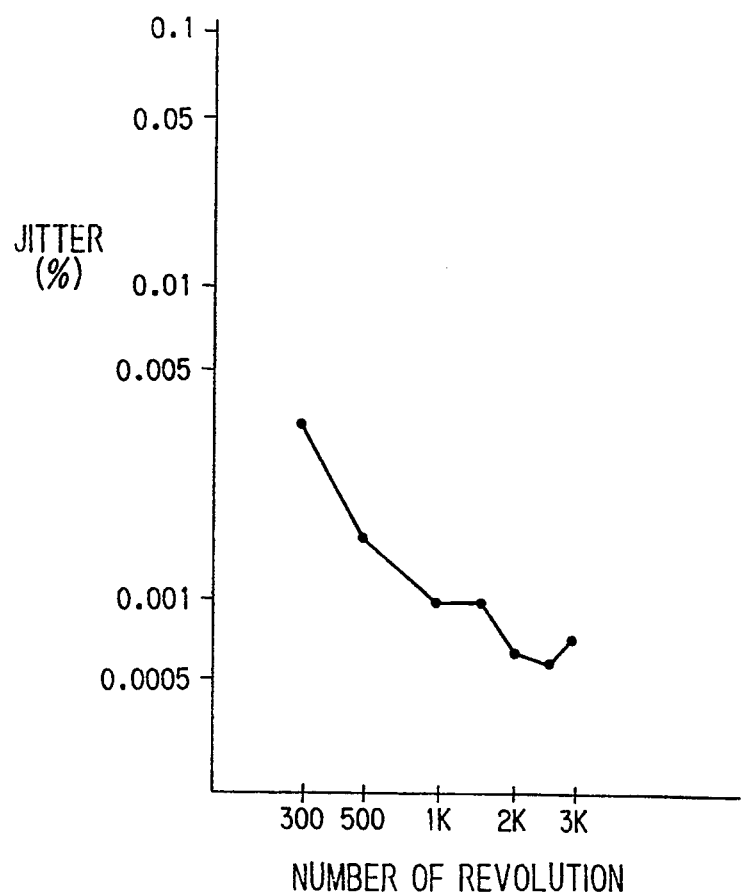
FIG. 7 illustrates a characteristic diagram for indicating the relation between the jitter and the rate of revolution.

FIG. 6 is a characteristic diagram for indicating an instruction voltage vs the rate of revolution of the motor 4 and as apparent from FIG. 6, the rate of revolution has a substantial linear relation with the instruction voltage. FIG. 7 is a characteristic diagram for indicating a relation between the jitter and the rate of revolution and it is apparent that the jitter is quite small in its magnitude.

In addition, FIG. 6 indicates a rising characteristic and a descending characteristic of the motor 4 and it is apparent that the rising and descending are symmetrical to each other and no disturbance is found in them.

Figure 8:
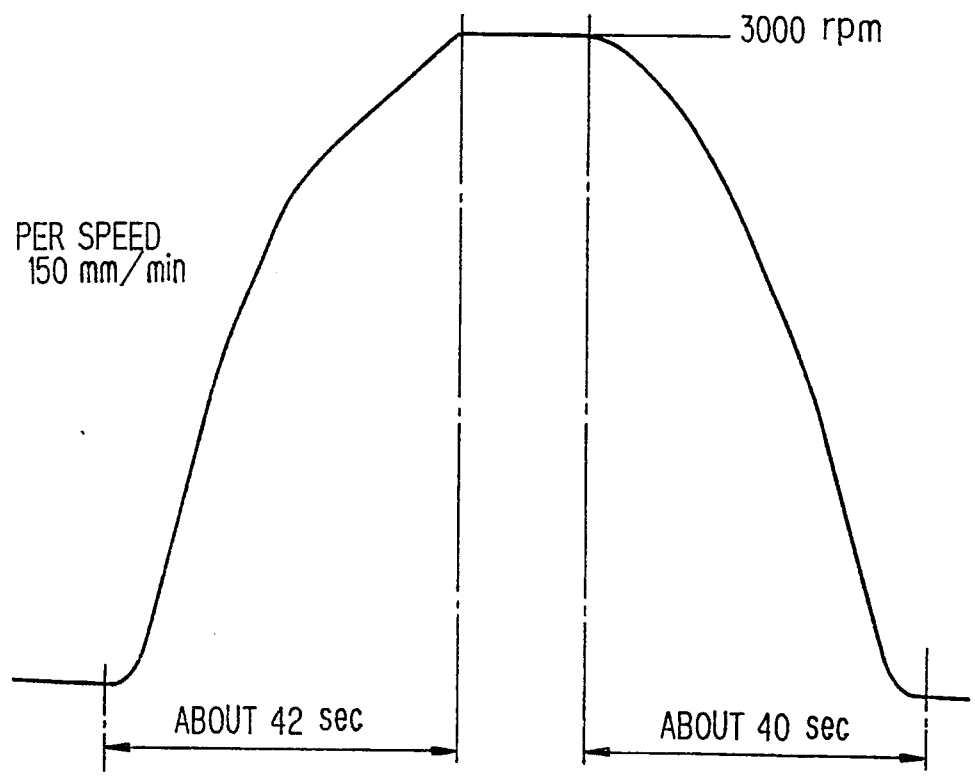
FIG. 8 is a characteristic view for showing a relation of an instruction voltage vs a rotational speed of the motor of the preferred embodiment shown in FIG. 1.

As shown in FIGS. 6 to 8, it is apparent that the brushless motor has a superior characteristics. Accordingly, there is no rotational displacement in center of the turn-table 5 directly driven by the motor 4, 80 that a quite stable rotation of the table is attained and further a quite accurate acceleration can be given to the first acceleration transducer 12a to the fourth acceleration transducer 12d.

The rotational shaft supporting part 5a of the turn-table 5 rotated by the motor 4 is integrally formed with the rotating cylinder 6b of the air bearing 6 and rotatably supported at the fixed cylinder of the air bearing 6 under a non-contact condition, so that no mechanical vibration is generated. In addition, no wear or seizure is generated and noise caused by the brush of the prior art is not generated from the motor 4 or the rotary transformers 13a to 13d, so that noise is not overlapped to the detected outputs of the first acceleration transducers 12a to the fourth acceleration transducer 12d and further an acceleration detection can be carried out in a more accurate manner.

In this way, the turn-table 5 is rotated and rotationally supported to enable an acceleration corresponding to a rotational speed of the turn-table 5 to be given accurately to the first acceleration transducer 12a to the fourth acceleration transducer 12d stored in and fixed to each of the acceleration transducer mounting portions 5a3 of the turn-table 5.

Each of the detection outputs of the first acceleration transducer 12a to the fourth acceleration transducer 12d is individually inputted to the multiplexer 31. The multiplexer 31 may select the detection outputs of the first acceleration transducer 12a to the fourth acceleration transducer 12d for every output of the first acceleration transducer 12a to the fourth acceleration transducer 12d in response to a control signal of the controller 32, in other words, for every channel 1 to channel 4 corresponding to these first acceleration transducer 12a to the fourth acceleration transducer 12d and output them to the A/D converter 33.

The A/D converter 33 converts the detection outputs of the first acceleration transducer 12a to the fourth acceleration transducer 12d outputted from the multiplexer 31 into the digital signals of 12 bits in response to the output signal from the controller 32 and then outputs it to the P-S converter 34.

The P-S converter 34 converts the parallel data of the detection outputs of the first acceleration transducer 12a to the fourth acceleration transducer 12d of 12 bits outputted from the A/D converter 33 into a serial data in response to an output signal from the controller 32 and then outputs the data to the modulator 35.

The modulator 35 modulates an output signal of an oscillator stored in the modulator 35 to 50 KHz and 25 KHz, respectively, in correspondence with "1" and "0" of the serial data sent from the P-S converter 34 in response to the output signal of the controller 32 and then applies the signal to the primary winding 36P of the rotary transformer 36.

The modulation signal of serial data induced at the secondary winding 36S of the rotary transformer 36 is inputted to the demodulator 37. The demodulator 37 demodulates the modulation signal in response to the output signal of the controller 38, outputs the serial data of "1" and "0" and feeds them to S-P converter 39.

The S-P converter 39 converts the demodulation signal of the serial data sent from the demodulator 37 into the parallel data in response to the output signal from the controller 38 and latches them to the latch circuits 40a to 40d for every detected outputs of the first acceleration transducer 12a to the fourth acceleration transducer 12d in response to the control signal of the controller 38.

The parallel data latched to each of the latch circuits 40a to 40d is sent to the D/A converters 41a to 41d, and its detected output is converted into an analogue signal for every first acceleration transducer 12a to the fourth acceleration transducer 12d by the D/A converters 41a to 41d and outputted.

Each of the outputs of the latch circuits 40a to 40d is converted into a decimal number by a binary coded decimal method, outputted to the display device 43 and displayed to the display device 43.

In turn, the parallel data outputted from the S-P converter 39 is sent to the CPU 15 shown in FIG. 5, thereby it is also possible to perform an analyzing process of the detected outputs of the first acceleration transducers 12a to the fourth acceleration transducer 12d, and the results of the analyzing method can be displayed in the display device 43 or printed out at the printer 18 under an operation of the keyboard 16.

It is also possible to apply functions of supervising a history of the product or a statistic processing function by using a general-purpose personal computer in such an analyzing processing system.

Of course it is apparent that in place of the personal computer, an exclusive micro-computer may also be used.

Then if the setting of the rotational speed of the motor 4 is changed over in a stepwise manner under an operation of the switch 28, a stepwise acceleration is applied to the first acceleration converter 12a to the fourth acceleration converter 12d in response to a stepwise changing-over of rotation, each of the outputs of the acceleration converter can be fed out and accordingly it is possible to realize a multi-stage program for setting the acceleration.

In this way, according to the preferred embodiment, the turn-table 5 is directly driven to rotate by the brushless motor 4 and at the same time the rotating shaft supporting part 5a of the turn-table 5 is rotatably supported by the air bearing 6 under a non-contact condition, the acceleration detected outputs of a plurality of acceleration transducers mounted on and fixed to the turn-table 5 are inputted to the multiplexer 31 for every channel of the first acceleration transducer 12a to the fourth acceleration transducer 12d, selected for every detected output of each of the acceleration transducers and the signals are converted into digital signals by the A/D converter 33, and thereafter the data is converted into a serial data by the P-S converter 34. Each of "1" and "0" of the serial data is modulated into 50 KHz and 25 KHz by the modulator 35, and thereby the modulated signal is transmitted to the demodulator 37 mounted at the fixed side under a no-contact condition through the rotary transformer 36, so that this has an advantage that noise of the motor 4 or wear of the motor 4 is eliminated, a low consumption power is available and a noise is not overlapped to the detected outputs and an entire system can be made in a small size.

In addition, since the shaft is rotatably supported by the air bearing 6, a rotational accuracy in either the thrust or radial direction can be improved up to about 0.05 μm and thus correspondingly an accurate acceleration can be generated.

Then, the configuration of the second preferred embodiment of the present invention will be described mainly in reference to FIG. 9.

The second preferred embodiment is constructed such that a transmitting system of the detected output of the measured acceleration transducer is partially modified, a predetermined instruction signal is transmitted without noise to the signal adjusting means arranged on the rotating turn-table from the fixed side and a predetermined instruction operation can be accurately carried out.

Figure 9:
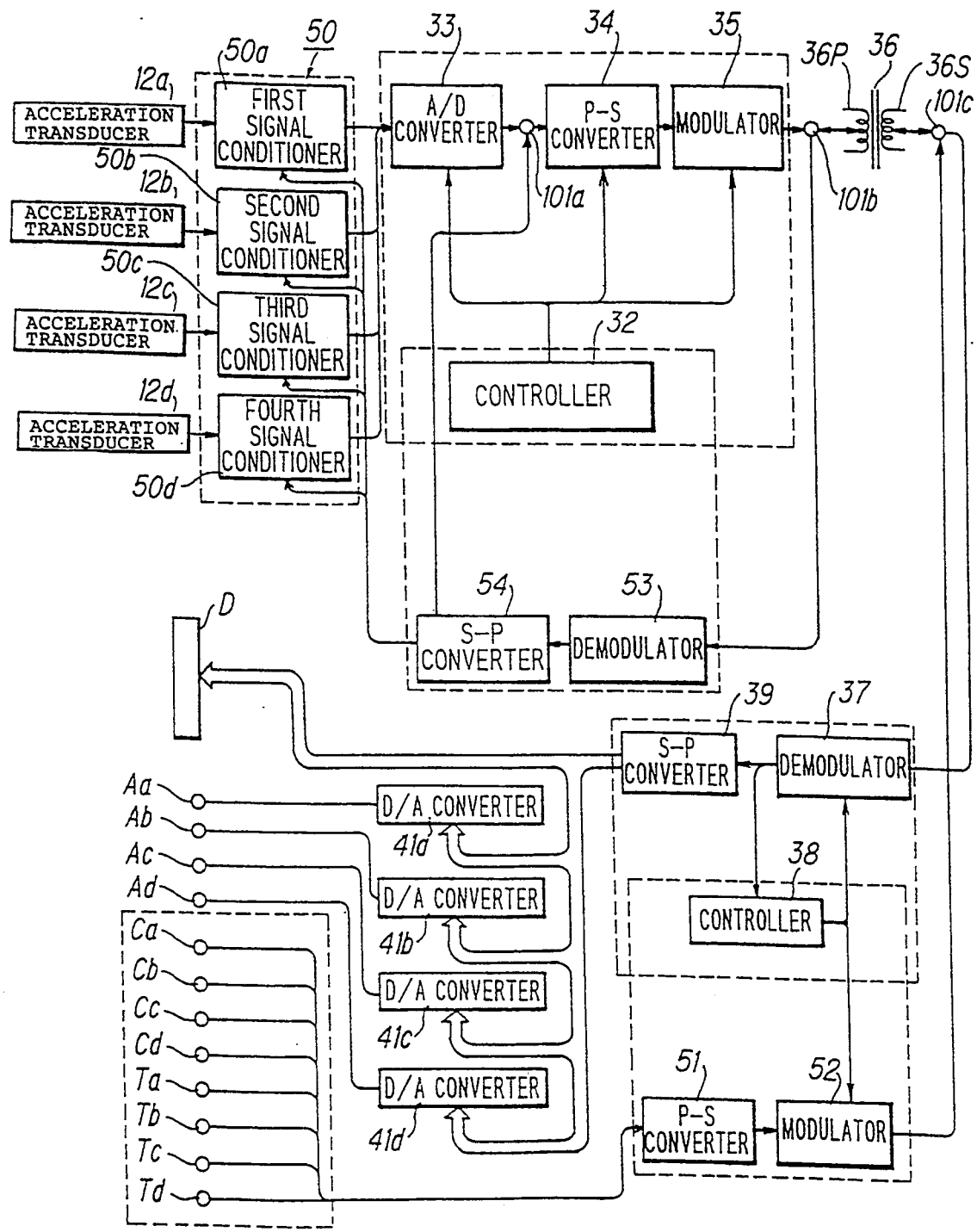
FIG. 9 is a block diagram for showing a circuit configuration of the second preferred embodiment of a centrifugal type acceleration measuring device differing from that of the preferred embodiment shown in FIG. 4.

Reference numerals 12a to 12d in FIG. 9 denote the first acceleration transducer to the fourth acceleration transducer acting as a physical amount—electrical amount converter for detecting a physical amount and converting it into an electrical signal.

These first acceleration transducer 12a to fourth acceleration transducer 12d are similar to those of FIG. 4, wherein an acceleration of the turn-table during its rotation at a predetermined position is detected and converted into an electrical signal.

As to the configuration of the centrifugal type acceleration measuring device in the second preferred embodiment, it has a similarity to that shown in FIGS. 1, 2 and 3 and its description will be eliminated in order to avoid its dual expression.

The block diagram shown in FIG. 9 is also partly in common with the block diagram shown in FIG. 4, so that its differing configuration will be mainly described.

At first, in reference to FIGS. 2 and 9, the transmitting system and the processing system for the detected outputs in the second preferred embodiment will be described.

As shown in FIG. 9, in the second preferred embodiment, this is constructed such that the four our acceleration transducers of the first acceleration transducer 12a to the fourth acceleration transducer 12d can be measured concurrently.

Each of these first acceleration transducer 12a to the fourth acceleration transducer 12d is stored and mounted at each of the four acceleration transducer mounting parts 5a3 of the turn-table 5 shown in FIGS. 1 and 3, respectively.

The detected outputs of the first acceleration transducer 12a to the fourth acceleration transducer 12d are inputted to the first signal conditioner 50a to the fourth signal conditioner 50d stored in the storing part 5a2.

The signal conditioner 50 has some functions such as a function to properly amplify a minute signal outputted from the acceleration transducer and output it, a function to output a predetermined or any optional calibration, a filtering function for passing only a signal having a predetermined range of frequency and an auto-balancing function for removing a resistance unbalanced component and/or capacitance unbalanced component of a bridge circuit included in the strain gauge type physical amount—electrical amount converter and for automatically getting a balanced condition or the like.

The four signal conditioners 50a to 50d are connected to each other by a control signal line and constructed such that each of their outputs can be made effective under a predetermined order by the controller 32 or other control circuits and further the detected output of the signal conditioner 50 specified by the remote control can be controlled and an output of the calibration value signal can be controlled.

Accordingly, the detected outputs corresponding to the accelerations of the first acceleration transducer 12a to the fourth acceleration transducer 12d are respectively amplified by each of the first signal conditioner 50a to the fourth signal conditioner 50d so as to process a wave-form formation. or the like.

The first signal conditioner 50a to the fourth signal conditioner 50d are controlled by a stored control circuit and operated so as to output the output signals under a predetermined order to the analogue/digital (herinafter called as "A/D") converter 33 of 12-bits, for example.

This A/D converter 33 converts each of the outputs of the first acceleration transducer 12a to the fourth acceleration transducer 12d outputted from each of the signal conditioners 50a to 50d into a digital signal in response to a control signal of the controller 32 and outputs it to the aforesaid parallel-serial (hereinafter "P-S") converter 34 through a changing-over unit 101a.

This P-S converter 34 converts a digital signal of 12-bits outputted from the A/D converter 33 into a serial signal by a control signal of the controller 32 and outputs it to the aforesaid modulator 35.

Although not shown, an oscillator is stored in the modulator 35 and a modulation is applied for every "1" and "0" of the serial converted data inputted from the P-S conveter 34 in response to the output signal of the controller 32.

In this preferred embodiment, the output signals (pulse signals) of the oscillator are modulated, for example, "1" of the serial data is modulated to 2 fHz and "0" is modulated to fHz and then it is outputted to the primary side of the rotary transformer 36, i.e. the rotating part through the changing-over unit 101b.

The output signals of the oscillator are made such that a setting range under a certain frequency range about 2 fHz and fHz corresponding to "1" and "0" of the serial data be made variable in response to material quality, the number of windings and the characteristics of the rotary transformer, and thereby the most suitable transmitting efficiency can be selected. For example, a value of f=10 KHz can be set in response to the rotary transformer and a higher frequency can be selected.

The first signal processing means is constructed as its essential components the controller 32, A/D converter 33, P-S converter 34 and modulator 35.

In FIG. 1, the rotary transformer 36 is disposed below the rotating main shaft of the motor 4. In FIG. 9, the primary winding 36P and the secondary winding 36S (that is, the winding at the fixed side) of the rotary transformer 36 are electromagnetically coupled to each other.

Signals of 2 fHz and fHz corresponding to "1" and "0" induced at the secondary winding 36S of the rotary transformer are inputted to the aforesaid demodulator 37 through the changing-over unit 101c.

To this demodulator 37 is inputted a control signal from the controller 38. The demodulator 37 demodulates an induction signal in the secondary winding 36S of the rotary transformer 36 to the digital measured data in response to the control signal and outputs it to the aforesaid serial-parallel (hereinafter called as "S-P") converter 39.

Also to this S-P converter 39 is inputted the control signal from the controller 38. The digital serial data outputted from the demodulator 37 is converted into a parallel data of 12-bits in response to the control signal.

As the essential components of the demodulator 37, controller 38 and S-P converter 39, the second signal processing means is constructed. The second signal processing means becomes the signal processing means at the fixed side.

The S-P converter 39 of the second signal processing means is made such that a digital signal is outputted to the digital output terminal D as it is and the signal is outputted to the digital/analogue (hereinafter called as "D/A") converters 41a to 41d.

Each of the D/A converters 41a to 41d corresponds a different one of the first acceleration transducers 12a to fourth acceleration transducer 12d a different one of the first signal conditioner 50a to the fourth signal conditioner 50d. Each of the digital signals of the S-P converter 39 corresponding to each of the output signals of the first acceleration transducer 12a to the fourth acceleration transducer 12d is converted into an analogue signal, and is outputted to the analogue output terminals Aa to Ad.

The digital signal of the S-P converter 39 sent to the digital output terminal D is taken out as a digital signal corresponding to each of the outputs of the first acceleration transducer 12a to the fourth acceleration transducer 12d; for example, the digital signal is transmitted to the CPU 15 (refer to FIG. 5) and applied as an analyzing process for the detected outputs of the first acceleration transducer 12a to the fourth acceleration transducer 12d.

Analogue signals appearing at the analogue output terminals Aa to Ad correspond to the outputs of the first acceleration transducer 12a to the fourth acceleration transducer 12d, and the signal can be displayed at the display device not shown or recorded in a magnetic recording and reproducing means or measured by a measuring device.

In turn, each of the channel specifying switches Ca to Cd is a switch for outputting a specifying signal for specifying what signal conditioner 50 is to be specified when the instructions such as calibration, zero-adjustment and auto-balance adjustment or the like are outputted to the first signal conditioner 50a to the fourth signal conditioner 50d. Each of these channel specifying switches Ca to Cd correspond to a different one of the first acceleration transducer 12a to the fourth acceleration transducer 12d.

Switches Ta and Tb are calibration instruction switches, wherein they may output an instruction signal when each of the (+) calibration value and (−) calibration value against the first signal conditioner 50a to the fourth signal conditioner 50d, respectively.

A zero adjusting instruction switch Tc is a switch for use in outputting the instruction signal when a DC zero for the signal conditioner 50 or the like is taken.

In addition, the auto-balance instruction switch Td is a terminal to use in outputting an signal for instructing that a balance in each of the bridge circuits is set to the first signal conditioner 50a to the fourth signal conditioner 50d.

In addition, the instruction signal generating means is constructed by the channel specifying switches Ca to Cd, compensation instruction switches Ta, Tb, a zero adjustment instruction switch Tc and an auto-balance instruction switch Td or the like.

Channel instruction signals outputted from the channel specifying switches Ca to Cd and the instruction signals outputted from each of the instruction switches Ta to Td are digital signals of plural bits, inputted to the P-S converter 51, where the instruction signals are converted into the serial signals, and are inputted to the modulator 52.

The modulator 52 modulates the digital instruction signals in response to the control signal from the controller 38 and applies the modulated signal to the secondary winding 36S of the rotary transformer 36.

In this way, the third signal processing means is constructed with the P-S converter 51, modulator 52 and controller 38 being applied as essential components. The controller 38 is commonly used in the second and third signal processing means.

The changing-over units 101a to 101c may constitute the changing-over means, wherein when the specifying signals from the channel specifying switches Ca to Cd and the instruction signals from the calibration switches Ta to Td are outputted, the changing-over units may prevent an output signal of the A/D converter 33 from being transmitted from the primary winding 36P of the rotary transformer 36 toward the secondary winding 36S and the changing-over units are changed over in such a way as the these channel specifying signals and the instruction signals are transmitted from the secondary winding 36S of the rotary transformer 36 toward the primary winding 36P.

In turn, when the channel specifying signal and each of the instruction signals are not outputted, each of the changing-over units 101a to 101c is changed over in such a way as an output of the A/D converter 33 may be transmitted from the primary winding 36P of the rotary transformer 36 toward the secondary winding 36S.

A channel specifying signal and each of the instruction signals transmitted from the secondary winding 36S of the rotary transformer 36 toward the primary winding 36P are demodulated by the demodulator 53 through the changing-over unit 101b, thereafter they are converted into parallel signals by the S-P converter 54.

Outputs of the S-P converter 54 are added to the changing-over unit 101a and the first signal conditioner 50a to the fourth signal conditioner 50d.

An output signal of the S-P converter 54 is added to the changing-over unit 101a, thereby as described above, an output signal of the A/D converter 33 is prevented from being inputted to the P-S converter 34 and further prevented from being transmitted from the primary winding 36P of the rotary transformer 36 to the secondary winding 36S. Along with this operation, the output signals of the first signal conditioner 50a to the fourth signal conditioner 50d, a channel specifying signal and an instruction signal can be prevented from interfering with each other.

As shown in FIG. 5, an output of the S-P converter 39 appearing on the digital output terminal D is outputted to the CPU 15, the acceleration detecting outputs detected by the first acceleration transducer 12a to the fourth acceleration transducer 12d are analyzed by the CPU 15, various data processings are carried out under an operation of an operator through the key-board 16 and the results of analyzing processing can be printed out by the printer 18 as measured value data.

The first acceleration transducer 12a to the fourth acceleration transducer 12d and the rotary transformer 36 in each of the components in FIG. 9 and the demodulator 53 and the S-P converter 54 are disposed at the rotary side and then the components of the demodulator 37 to the demodulator 52 are disposed at the fixed side.

Although not shown in FIG. 9, it is assumed that the rotary transformer 13, pulse generator 20 to regulator 24, BCD converter 42 and the display device 43 may also be provided in the second preferred embodiment.

Operation of the second preferred embodiment constructed as above will be described as follows.

At first, an electrical power is supplied from the external power supply to the regulator through rotary transformer, the AC voltage supplied from the external power supply is rectified into a DC voltage by this regulator, thereafter the voltage is changed into a constant voltage and then an operating power supply is fed to the signal conditioner 50 and the controller 32 or the like.

A rotational speed of the motor 4, i.e. an acceleration of the motor 4 is set under an operation of the switch 28 shown in FIG. 2, thereby its set rotational speed is displayed at the display device 43.

A controlling operation for the motor 4 is similar to that of the first preferred embodiment, so that its description will be eliminated.

The detected outputs from the first acceleration transducer 12a to the fourth acceleration transducer 12d rotated on the turn-table at a predetermined rotational speed are inputted individually to the first signal conditioner 50a to the fourth signal conditioner 50d. This signal conditioner 50 is operated such that the detected outputs of the first signal conditioner 50a to the fourth signal conditioner 50d for every output of the first signal conditioner 50a to the fourth signal conditioner 50d, in other words, for every channel 1 to 4 corresponding to the first acceleration transducer 12a to the fourth acceleration transducer 12d are selected in response to the control signal of the control circuit or the controller 32 and outputted to the A/D converter 33.

The A/D converter 33 converts the analogue detected outputs for every first acceleration transducer 12s to the fourth acceleration transducer 12d outputted from the first signal conditioner 50a to the fourth signal conditioner 50d into the digital signals of 12-bits in response to the output signals of the controller 32 and then outputs the signals to the P-S converter 34 through the changing-over unit 101a.

At this time, the channel specifying signal is not inputted by the channel specifying switches Ca to Cd and the instruction signal is not inputted through the calibration instruction switches Ta to Td. Accordingly, all the changing-over units 101a to 101c can transmit the detected outputs of the first acceleration transducer 12a to the fourth acceleration transducer 12d from the rotary side to the fixed side. With such an arrangement, as described above, the output signal of the A/D converter 33 is transmitted to the P-S converter 34 through the changing-over unit 101a.

The P-S converter 34 converts the parallel data of the detected outputs for every first acceleration transducer 12a to the fourth acceleration transducer 12d of 12-bits outputted from the A/D converter 33 into the serial data in response to the control signal from the controller 32 and outputs it to the modulator 35.

The modulator 35 modulates the output signal of the oscillator stored in the modulator 35 to frequencies of 2 fHz and fHz in response to "1" and "0" of the serial data sent from the P-S converter 34 in reference to the control signal of the controller 32 and then applies it to the primary winding 36P of the rotary transformer 36 through the changing-over unit 101b.

The modulation signal of serial data induced at the secondary winding 36S of the rotary transformer 36 is inputted to the demodulator 37 through the changing-over unit 101c. The demodulator 37 demodulates the modulation signal in response to the output signal of the controller 38 and sends the serial data of "1" and "0" to the S-P converter 39.

The S-P converter 39 converts the demodulation signal of the serial data sent from the demodulator 37 into a parallel data in response to an output signal from the controller 38, outputs it to the D/A converters 41a to 41d in response to the control signal of the controller 38 for every detected output of the first acceleration transducers 12a to the fourth acceleration transducer 12d and then outputs it to the digital output terminal D.

The parallel data outputted from the S-P converter 39 outputted to the digital output terminal D is sent to the CPU 15 shown in FIG. 5; thereby the detected outputs of the first acceleration transducer 12a to the fourth acceleration transducer 12d can be analyzed, and the results of this analyzing process can be displayed in the display device 45 or printed out in the printer 18 under an operator's operation at the keyboard 16.

Then, if the setting of the rotational speed of the motor 4 is changed over in a stepwise manner under an operation of the switch 28, the stepwise acceleration is applied to the first acceleration transducer 12a to the fourth acceleration transducer 12d in response to the changing-over of the stepwise rotation, so that each of the outputs of the acceleration ration transducer at that time can be fed out and accordingly a multi-stage programming for setting the acceleration can be realized.

Then, the operation in the case that the instruction signals from the calibration instruction switches Ta to Td and the channel specifying signals from the channel specifying switches Ca to Cd are sent toward the first signal conditioner 50a to the fourth signal conditioner 50d will be described.

For the sake of this description, it is typically described that the channel specifying signals and the instruction signals are sent to the first signal conditioner 50a of the first channel of the first signal conditioner 50a to the fourth signal conditioner 50d.

It is of course apparent that the instruction signals and the channel specifying signals can be similarly sent to the second signal conditioner 50b to the fourth signal conditioner 50d and in this case each of the channel specifying signals may be sent from each of the channel specifying switches Cb to Cd.

As described above, in the event that the first channel specifying signal is sent to the first signal conditioner 50a of the first channel and a predetermined (+) calibration value signal is outputted to the signal conditioner 50a, the calibration instruction switch Ta of the calibration instruction switches Ta to Td is operated to send the instruction signal to be calibrated to (+). In the event that a predetermined (−) calibration value signal is outputted, the calibration instruction switch Tb is operated.

In addition, in the event that a zero adjustment (an offset adjustment) is carried out, a zero-adjusting instruction signal is inputted from the zero adjustment switch Tc and when an auto-balance adjustment is carried out, an auto-balance instruction signal is inputted from the auto-balance instruction switch Td.

Such an instruction signal and the channel specifying signal are sent to the P-S converter 51, where the parallel signal is converted into a serial signal, thereafter the serial signal is outputted to the modulator 52. The modulator 52 modulates it in response to the control signal from the controller 38 and outputs it to the changing-over unit 101c.

When all the aforesaid channel specifying signals and instruction signals are outputted, the changing-over units 101a to 101c are changed over through a controller not shown so as to prevent a signal from being transmitted from the rotating part toward the fixed part and to enable a signal to be transmitted from the fixed side to the rotating part in turn.

Accordingly, the output signal of the modulator 52 is applied to the secondary winding 36S of the rotary transformer 36 via changing-over unit 101c, and an output signal of the modulator 52 induced at the primary winding 36P of the rotary transformer 36 is inputted to the demodulator 53 through the changing-over unit 101b. The demodulator 53 demodulates the modulated signal, converts it into the serial data of "1" and "0", respectively, and feeds it to the S-P converter 54.

This S-P converter 54 converts the demodulated signal sent from the demodulator 53 into the parallel data and sends the channel specifying signal and the instruction signal to the first signal conditioner 50a of the first channel.

With such an arrangement, the first signal conditioner 50a performs either one of the calibration, zero-adjustment and an auto-balancing in accordance with either one of the instruction signals, i.e. (+), (−) calibration instructions, zero adjustment instruction and auto-balance instruction.

In the case of the second preferred embodiment of the present invention, the acceleration detected outputs of the first acceleration transducer 12a to the fourth acceleration transducer 12d are inputted for each of the channels of the first signal conditioner 50a to the fourth signal conditioner 50d corresponding to these detected outputs, only one of the signal conditioners 50a to 50d of four channels is selected in sequence in time-series, converted into a digital signal with the A/D converter 33, thereafter the output is converted into a serial data with the P-S converter 34, each of "1" and "0" of the serial data is modulated into 2 fHz and fHz with the modulator 35, the modulation signal is transmitted to the demodulator 37 disposed at the fixed side under a non-contact condition through the rotary transformer 36 and then its output is converted into the parallel data with the S-P converter 39.

Due to this fact, also in this preferred embodiment, the detected outputs of the first acceleration transducer 12a to the fourth acceleration transducer 12d can be transmitted from the rotary side to the fixed side under a non-contact condition, no wear loss such as one found in the prior art slip ring system occurs, and not only the maintenance can be eliminated, but also no occurrence of sliding noise is found and then an S/N ratio can be improved and an accurate transmittance of the data can be attained.

The system is constructed such that the channels can be specified for each of the signal conditioners 50a to 50d and various instruction signals can be transmitted and in this case the changing-over units 101a to 101c are changed over to the transmitting state from the fixed side to the rotary side and the transmittance at the opposite side can be prohibited, so that the calibration operation for each of the signal conditioners 50a to 50d and an auto-balancing operation can be remote controlled at the fixed side and then a more convenient use can be attained and an accurate detecting output may always be attained.

In the second preferred embodiment, for a sake of description, the case in which an acceleration of the turn-table applied as a measured item is detected by the first acceleration transducer 12a to the fourth acceleration transducer 12d has been described. However, the present invention can be applied for an overall system of a physical amount—electrical amount transducer capable of detecting a physical amount and converting it into an electrical signal, wherein for example, physical amounts such as torque, load, displacement, pressure, temperature, humidity or tile like in the rotary member are detected using a torque transducer, a load transducer, a displacement transducer, a pressure transducer, a temperature sensor and a humidity sensor or the like.

Outputs of each of the physical amount-electrical amount transducers may be directly connected to the multiplexer without any signal conditioner and in this case the outputs of each of the transducers are individually changed over in sequence by an output signal of the controller storing the sequence counter therein and sent to the A/D converter 33.

Then, a configuration of the third preferred embodiment of the present invention will be described in detail mainly in reference to FIGS. 10 to 13.

Figure 10:
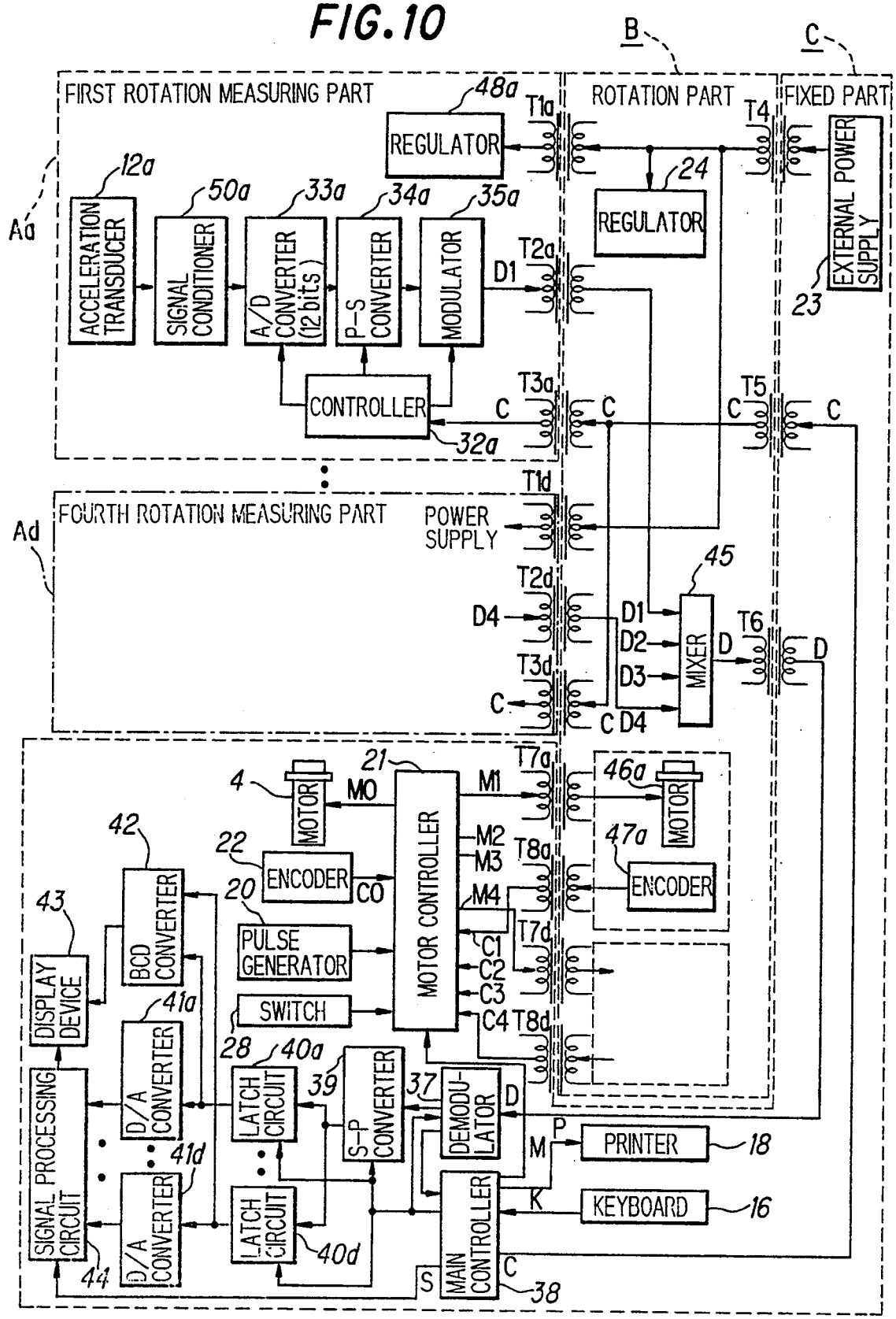
FIG. 10 is a block diagram for showing a circuit configuration of the third preferred embodiment of a centrifugal type acceleration measuring device further differing from the preferred embodiment shown in FIGS. 4 and 9.
Figure 11:
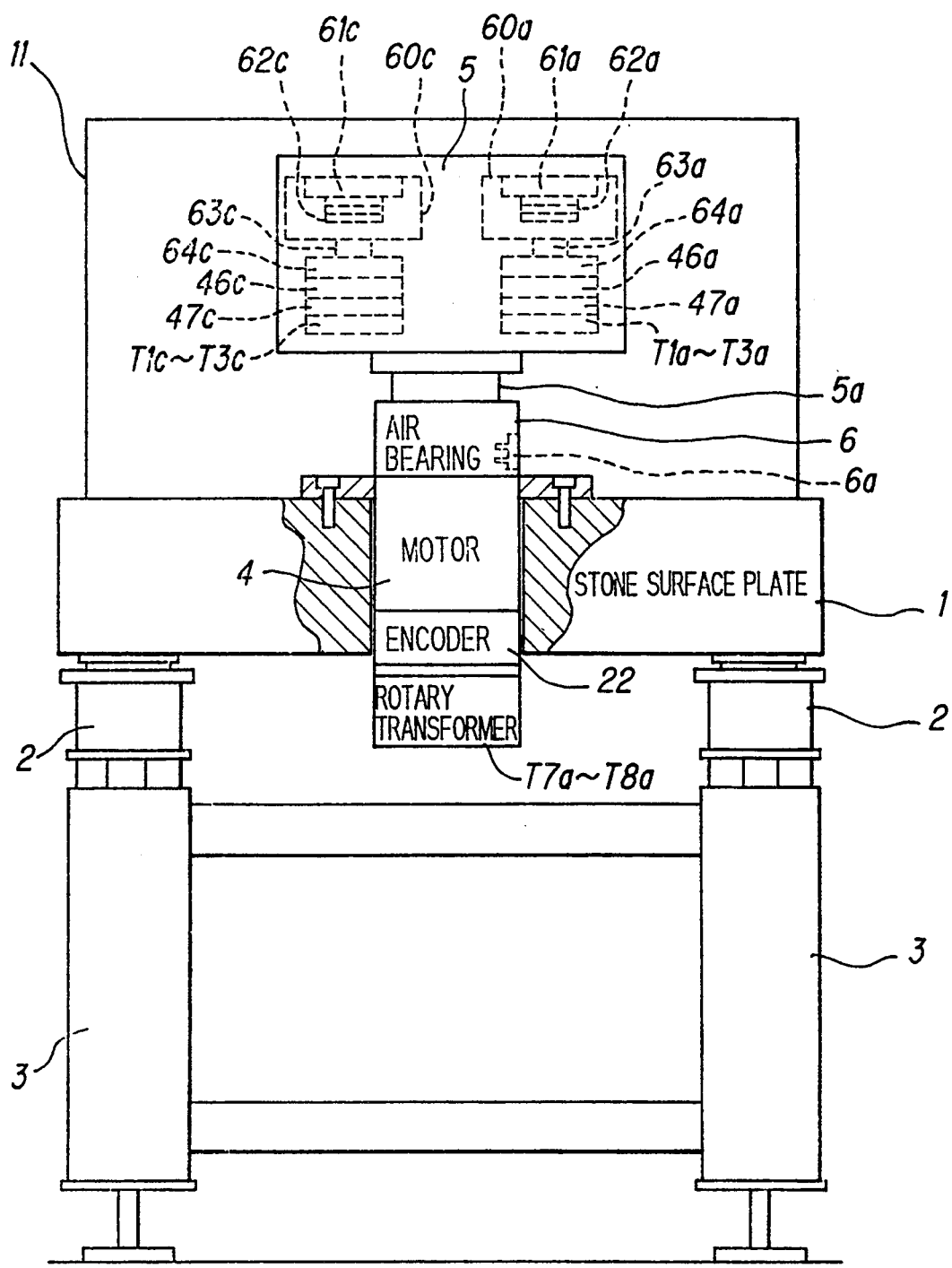
FIG. 11 is a front elevational view for showing a partly broken-away configuration of an outer appearance of the third preferred embodiment.
Figure 12:
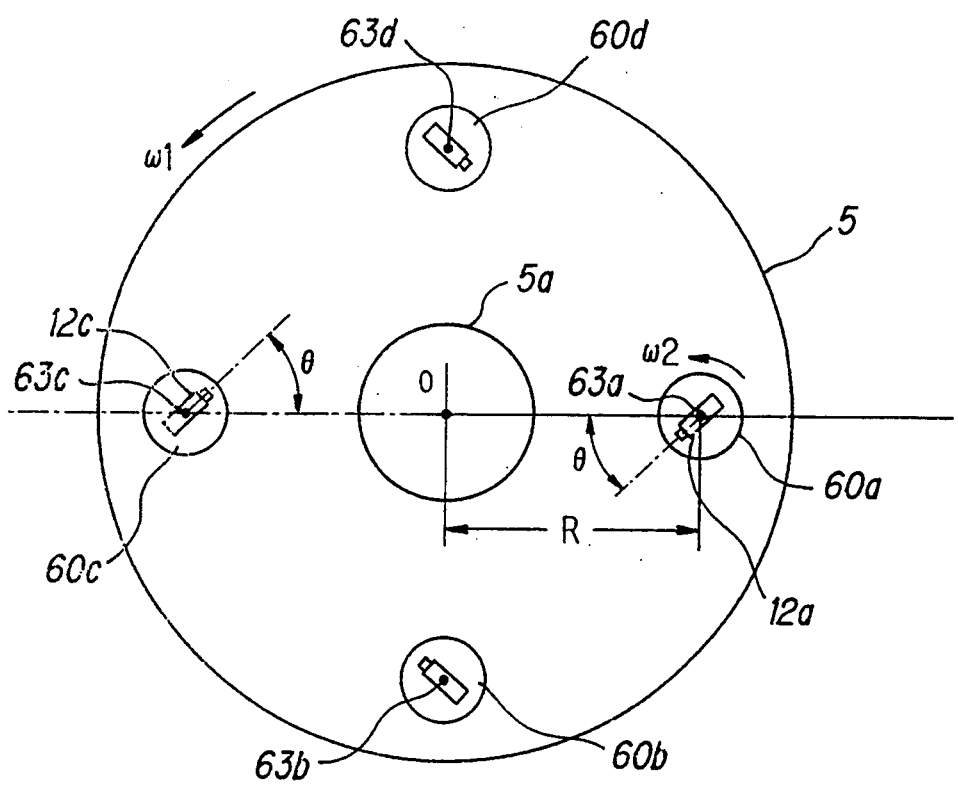
FIG. 12 is a schematic top plan view for illustrating a relation of arrangement and operation of the first turn-tables and the second turn-table of the third preferred embodiment.
Figure 13:
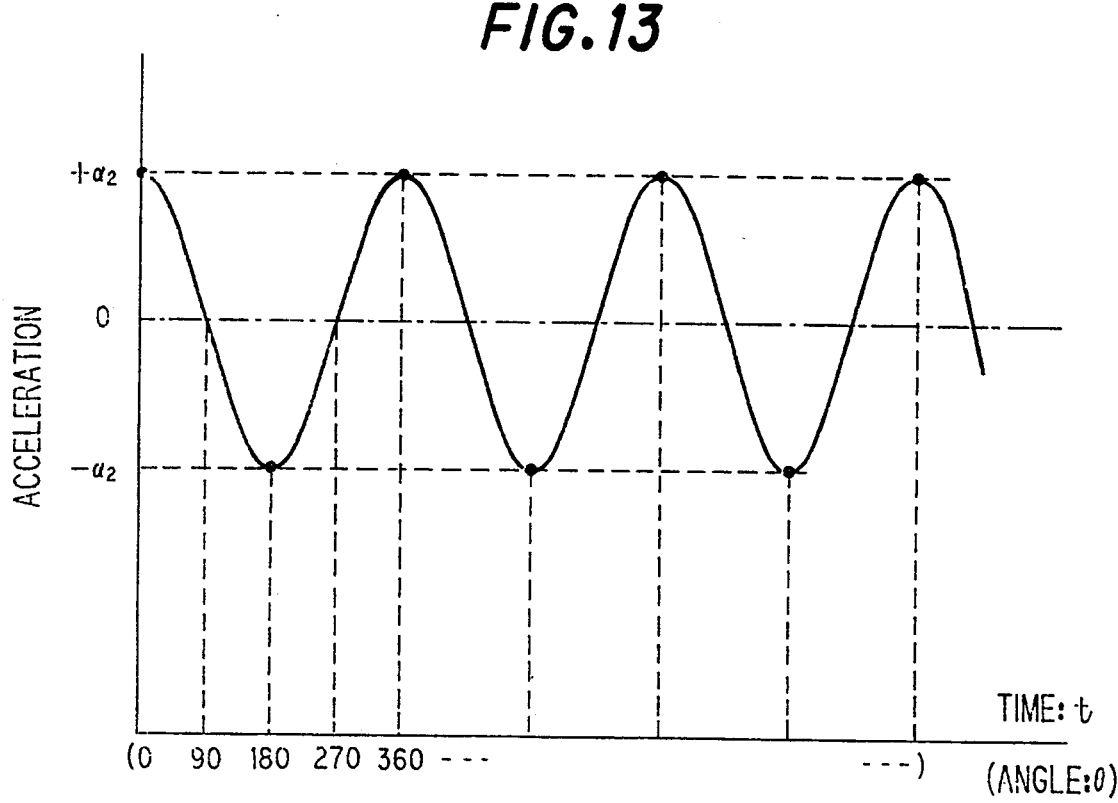
FIG. 13 is a waveform view for illustrating an operation of the third preferred embodiment.

FIG. 10 is a block diagram for showing a circuit configuration of the centrifugal type acceleration measuring device of the third preferred embodiment of the present invention. FIG. 11 is a front elevational view for showing an entire configuration of the third preferred embodiment of the present invention with a part being broken away. FIG. 12 is a top plan view for schematically indicating a state where the first turn-tables having the measured acceleration transducer disposed thereon are rotatably arranged on the second turn-table. FIG. 13 is a wave-form diagram for illustrating an operation of the third preferred embodiment.

In the third preferred embodiment, since it is in common with the aforesaid first and second preferred embodiments in many aspects, its dual description is avoided as much as possible and its different parts will be described.

That is, in the first preferred embodiment shown in FIG. 1, the turn-table 5 (hereinafter sometimes called as "the second turn-table") supported by the air bearing 6 is rotationally driven by the motor 4 so as to apply a specified acceleration to the acceleration transducers 12a to 12d and a measurement (a calibration) of a so-called static acceleration is carried out.

However, in case of the third preferred embodiment shown in FIGS. 11 to 13, the turn-tables 60a to 60d (hereinafter sometimes called as "the first turn-table") supported by the air bearings 64a to 64d are concurrently driven to rotate by motors 46a to 46d (46b and 46d are not shown) so as to perform a measurement (a calibration) of so-called dynamic acceleration of each of the acceleration transducers 12a to 12d.

This system will be described in reference to FIGS. 11 and 12, wherein the component parts rotationally. driving the second turn-table are similar to those shown in FIG. 1. However, tile component parts rotationally driving the first four turn-tables 60a to 60d in the preferred embodiment rotatably supported on the second turn-table 5 are substantially similar to those of FIG. 1 except that their sizes are different.

The first turn-tables 60a to 60d are rotatably supported under a non-contact condition by the air bearings 64a to 64d acting as the first bearings in which the fixed supporting part is fixed to the high rigid disk (a member corresponding to the stone surface plate 1) of the second turn-table 5.

That is, the outer circumferential surfaces of the air bearings 64a to 64d are provided with the air supplying part (not shown). To the air supplying part is supplied either a part of air generated by an air source shown in FIG. 2 and forcedly fed from an air cleaner 7 through an air supplying part 6a of the air bearing 6 or a compressed air fed to a central part of the second turn-table 5 through a compressed air feeding passage formed between the rotary side and the fixed side of the air bearing 6 via a proper supplying passage, thereby the rotary cylinder to which the rotating shaft supporting parts 63a to 63d of the first turn-tables 60a t to 60d is rotatably supported under a non-contacted condition.

Since each of the rotary transformers T1a to T1b, encoders 47a to 47d, brushless motors 46a to 46d (hereinafter abbreviated as "motor"), air bearings 64a to 64d and rotating shaft supporting parts 63a to 63d has a similar configuration as that of the aforesaid rotary transformers 13, 36, encoder 22, motor 4, air bearing 6 and rotary shaft supporting part 5, their further description will be eliminated.

As indicated by T1a to T1b, 47a to 47d ..., for a sake of description, affixes "a", "b", "c" and "d" are provided. However, all of them are partly illustrated in the drawings and some of them are eliminated. This is to avoid a complex illustration in the drawings and totally speaking, "a" of "a to d" denotes component members related to the first acceleration transducer 12a, "b" denotes the second acceleration transducer 12b, "c" denotes the third acceleration transducer, and "d" denotes the fourth acceleration transducer 12d, respective On the first turn-tables 60a to 60d are disposed the acceleration transducer mounting parts 61a to 61d for removably mounting and fixing each of them. Under the mounted conditions, in particular, the acceleration transducer mounting parts 61a to 61d are constructed in such a way as the centers of the sensitive parts of the acceleration transducers 12a to 12d coincide with the rotational centers of the first turn-tables 60a to 60d.

With such an arrangement, the acceleration transducers 12a to 12d are constructed such that the sensitive shafts are rotated around the centers thereof as the first turn-tables 60a to 60d are rotated.

In addition, at the central parts of the first turn-tables 60a to 60d are formed the hollow barrels 62a to 62d. In the hollow barrels are stored the signal conditioners 50a to 50d, A/D converters 33a to 33d, P-S transducers 35a to 35d and controllers 32a to 32d or the like in the same manner as that described in reference to FIG. 3.

In this preferred embodiment, the first turn-tables 60a to 60d are disposed in four positions in equally-spaced apart relation in 90° spacing and at positions spaced at a distance of R from a rotary center of the second turn-table 5. The acceleration transducers 12a to 12d are mounted one-by-one and fixed on each of the acceleration transducer mounting parts 61a to 61d.

A transmitting system and a processing system for the detecting method in the third preferred embodiment will be described mainly in reference to FIG. 10.

This preferred embodiment is constructed such that each of the accelerations of the four acceleration transducers 12a to 12d can be measured, respectively and for a sake of avoidance of complexity in description, the measurement of one acceleration transducer 12a will be described.

The acceleration transducer 12a receives a specified acceleration corresponding to a rotational speed and a rotating radius of the second turn-table 5.

At this time, the acceleration transducer 12a is made such that when its sensitive shaft coincides with a radiation axis passing through the rotational center O of the second turn-table 5 and a positive (+) direction of the sensitive shaft is directed toward the rotational center O, a detection output of positive (+) corresponding to the specified centrifugal acceleration and in turn the direction directs in a direction opposite to that of the rotational center O, the detection output corresponding to the specified centrifugal acceleration of negative (−) can be attained.

To the contrary, as the sensitive shaft is displaced from 0° to 90° in respect to the radial axis of the second turn-table, the acceleration component acting against the sensitive part of the acceleration transducer 12a is decreased due to the reason described below and the detected output is decreased from the positive maximum value to 0.

In addition, as the sensitive shaft is displaced from 90° to 180° in respect to the radial axis of the second turn-table, an acceleration component acting against the sensitive part of the acceleration transducer 12a is gradually increased in a negative direction, the detected output is varied from 0 to the negative maximum value and subsequently as the sensitive shaft is displaced from 180° to 270° and 270° to 360° in the same manner, the detected output is varied from the negative maximum value to 0 and from 0 to the positive maximum value.

This phenomenon is expressed by the following general equation. At first, a distance from the rotational center of the first turn-table 60a to the rotational center O of the second turn-table 5 (an eccentric distance) is defined as R, an angular velocity of the second turn-table 5 is $\omega_1$ (rate of the revolution: $N_1$ rpm), an angular velocity of the second turn-table 5 is $\omega_2$ (number of revolution: $N_2$ rpm), an acceleration $\alpha_1$ indicated in the following equation may act against the first turn-table 60a and the acceleration transducer 13a mounted at the same position as that of the first turn-table 60a.

$$\alpha_1 = R \cdot \omega_1^2 = R \cdot (2 \cdot \pi \cdot N_1/60)^2 \tag{1}$$

To the sensitive part of the acceleration transducer 12a disposed on the first turn-table 60a is acted an acceleration corresponding to a displacement angle $\theta$ of the sensitive shaft against the radial axis, wherein $\theta = 0°$ (360°) is attained, an acceleration $+\alpha_2$ of the positive peak value may act and in turn when $\theta = 180°$ is attained, an acceleration $-\alpha_2$ of a negative peak value may act.

A relation between the acceleration $\alpha_2$ and the displacement angle $\theta$ is expressed as follows.

$$\begin{aligned}\alpha_2 &= R \cdot \omega_1^2 \cdot \cos\theta \\ &= R \cdot (2 \cdot \pi \cdot N_1/60)^2 \cdot \cos\theta\end{aligned} \tag{2}$$

If it is assumed that the first turn-table 60a is rotated at a specified rate of revolution $N_2$ (rpm) from an angular position of $\theta = 0°$, the acceleration $\alpha_2$ acting against the sensitive part after a second of (t) is expressed by $$\alpha_2 = R \cdot (2 \cdot \pi \cdot N_1/60)^2 \cdot \cos(2 \cdot \pi \cdot N_2/60)t \tag{3}$$

due to a relation of $$\theta = (2 \cdot \pi \cdot N_2/60) \cdot t$$

FIG. 13 indicates a relation of the displacement angle $\theta$ of the sensitive shaft of the acceleration transducer 60a in respect to the radiation axis, time and variation of the acceleration.

The circuit configurations of the third preferred embodiment differing from those of the aforesaid first preferred embodiment or the second preferred embodiment will be described in reference to the block diagram shown in FIG. 10.

Although the basic configurations of the acceleration transducer 12a, signal conditioner 50a, A/D converter 33a, P-S converter 34a, modulator 35a and controller 32a are the same as those shown in FIGS. 4 and 9, the A/D converter 33a to modulator 35a and the controller 32a are common to each of the acceleration transducers 12a to 12d as shown in FIG. 4 and they are different in view of the fact that they are exclusive in the acceleration transducer 12a, so that the multiplexer or the changing-over unit is not used.

Each of the controllers 32a to 32d may receive a control signal of the main controller 38 through the rotary transformers T5 and T3a to T3d, instruct an A/D conversion against the A/D converters 33a to 33d under a predetermined order, execute a modulating operation against the modulators 35a to 35d and at the same time overlap the discriminating signal for specifying each of the measurement channels against each of the modulators 35a to 35d before or after the measured data.

A regulator 48 is applied for supplying a predetermined operating voltage to the acceleration transducer 12a and the signal conditioner 50a or the like, wherein it receives a power generated at the external power supply 23 disposed at the fixed part C through a rotary transformer T4 disposed between the fixed part C and the second turn-table 5, and through a rotary transformer T1a disposed between the second turn-table 5 and the first turn-table 60a in sequence and adjusts it to a predetermined voltage.

In this way, a part enclosed by a broken line in FIG. 10 mounted in the first turn-table 60a is defined as the first rotary measuring part Aa and similarly the parts mounted on the second, third and fourth turn-tables 60b, 60c and 60d are defined as the second, third and fourth rotary measuring portions Ab, Ac and Ad, respectively.

Modulation outputs outputted from each of the modulators 35a to 35d are inputted to the mixer 45 through each of the rotary transformers T2a to T2d.

The mixer 45 is comprised of a plurality of OR circuits or buffers so as to transmit any one of the modulation signals inputted in sequence from each of the rotary transformers T2a to T2d to the rear stage demodulator 37 through the rotary transformer T6.

The demodulator 37 receiving the modulation signal demodulate the measured data of the induction signal of the secondary winding of the rotary. transformer T6 into the digital signal by the control signal outputted from the main controller 38 and outputs it to the aforesaid S-P converter 39, and at the same time the demodulator demodulates the discrimination data of the induction signal overlapped to the modulation signal to the digital signal and outputs it to the main controller 38.

As described above, the S-P converter 39 converts a digital serial data outputted from the demodulator 37 into a parallel data of 12-bits, for example.

The parallel data is made such that a discriminating signal overlapped by the modulators 35a to 35d in the four latch circuits 40a to 40d is interpreted in response to an instruction signal from the main controller 38, and the main controller 38 selects the corresponding latch circuits 40a to 40d in response to the result of interpretation and latches them.

Subsequent D/A converters 41a to 41d, BCD converter 42 and display device 43 or the like are similar to those described in reference to FIG. 4.

The signal processing circuit 44 is operated such that the measured data inputted from the D/A converters 41a to 41d are applied for analyzing the detected outputs of acceleration in response to the control instruction of the main controller 38 forming a part of the CPU and further performs various data processings under an operator's operation of the keyboard 16, and results of processing are displayed at the display device 43.

Motor 4, encoder 22, pulse generator 20 and motor controller 1 are similar to those shown in FIG. 4.

The motor controller 21 is constructed such it performs not only a rotational control over the motor 4 for rotating the second turn-table 5, but also performs a rotational control of the motors 46a to 46d for rotationally driving the first four turn-tables 60a to 60d.

That is, the driving outputs M1 to M4 are supplied from the motor controller 21 to each of the motors 46a to 46d through the rotary transformers T7a to T7d, the number of revolution (a rotational angular velocity) of each of the motors 46a to 46d is measured, and the outputs C1 to C4 of the encoders 47a to 47d encoded are inputted to the motor controller 21 through the rotary transformers T8a to T8d.

The aforesaid rotary transformers T4, T5, T6, T7a to T7d, and T8a to T8d are disposed between the fixed side C and the rotary side B on the second turn-table 5, and the transformers T1a to T1d, T2a to T2d and T3a to T3d are disposed between the rotary side B and each of the rotation measuring parts Aa to Ad on the first turntables 60a to 60d, respectively.

The switch 28 is used for specifying the rotational speeds of the motor 4 and the motors 46a to 46d to the motor controller 21, the rate of revolution of the motor 4 is specified, thereby the acceleration to be given to the acceleration transducers 12a to 12d is set, a rotational speed of each of the motors 46a to 46d is specified and then an output of modulation component of a desired frequency can be taken out of the acceleration transducers 12a to 12d and thus a characteristic of frequency of each of the acceleration transducers 12a to 12d can be measured.

Operation of the third preferred embodiment constructed as above will be described.

At first, electrical power is supplied from the external power supply 23 to the regulator 24 through the rotary transformer T4, an AC voltage supplied from the external power supply 23 is rectified into a DC voltage with this regulator 24, thereafter the voltage is changed to a specified voltage and an operating power supply is supplied to the encoders 47a to 47d and the mixer 45 or the like.

The electrical power received by the rotary transformer T4 is supplied to the regulators 48a to 48d disposed at each of the rotation measuring parts Aa to Ad through the rotary transformers T1a to T1d. A specified DC voltage is attained by the regulators 48a to 48d in the same manner as described above and then an operating power supply is fed to the acceleration transducers 12a to 12d, signal conditioners 50a to 50d and the controller 32 or the like.

Rotational speeds of the motors 4, 46a to 46d are set under an operation of the switch 28 shown in FIGS. 2 and 10, thereby a value of acceleration given to each of the acceleration transducers 12a to 12d and a frequency of modulated frequency component of the acceleration transducers are set. The set rotational speeds and the frequencies are displayed in the display device 43.

Controlling operations for the motor 4 and motors 46a to 46d are substantially similar to those of the first preferred embodiment except the set rotational speed, so that their description will be eliminated.

The acceleration transducers 12a to 12d may receive the acceleration $\alpha_1$ based on the above equation (1) through the second turn-table 5 rotated at the set rate of revolution $N_1$, and its sensitive part may receive a component of force ($\cos\theta$) of $\alpha_1$ corresponding to the displacement angle $\theta$ and receive an acceleration $\alpha_2$ based on the above equations (2) or (3).

The detected outputs from each of the acceleration transducers 12a to 12d corresponding to the acceleration $\alpha_2$ are processed under a control of the controller 32a in the same manner as that of the aforesaid first preferred embodiment under an arrangement of the signal conditioners 50a to 50d, A/D converters 33a to 33d, P-S converter 34a and modulators 35a to 35d included in each of the first to fourth rotation measuring parts Aa to Ad, respectively. Finally, the frequencies of the outputs are modulated from the modulators 35a to 35d and then outputted as the detected data D1 to D6 to the rotary transformers T2a to T2d.

At this time, as described above, the discrimination signal is also modulated in its frequency and outputted from each of the modulators 35a to 35d.

The detected data D1 to D4 and discrimination data transmitted to the rotary side B through the rotary transformers T2a to T2d are inputted to the mixer 21.

The mixer 45 passes the detected data D1 to D4 one by one selectively outputted in sequence on the basis of a time-sharing process from the four modulators 35a to 35d under a control of each of the controllers 32a to 32d and transmits the data to the demodulator 37 through the rotary transformer T6.

Modulated signals of the serial detected data D1 to D4 inputted to the demodulator 37 in this way are processed in the same manner as that of the first preferred embodiment under a control of the main controller 38 by the S-P converter 39, latch circuits 40a to 40d, D/A converters 41a to 41d and BCD converter 42 and further displayed in the displaying device 43 under a control of the signal processing circuit 44.

Parallel data outputted from the S-P converter 39 is sent to the CPU 15 shown in FIG. 5 to enable the detected outputs of the first acceleration transducer 12a to the fourth acceleration transducer 12d to be analyzed and the results of analyzation can be displayed in the display device as described above by giving an input signal K under an operation of the operator at the keyboard 16 or printed out at the printer 18 by giving a printing signal P.

According to the third preferred embodiment, since the system is constructed as above, an occurrence of noise or wear at the motors 4 and 46a to 46d is eliminated in the same manner as those of the first and second preferred embodiments, and maintenance work is eliminated and at the same time a low consumption power can be realized, sliding noise is not overlapped on the detected outputs, an S/N ratio can be improved and an entire small size can be realized.

Since the first turn-tables 60a to 60d and the second turn-table 5 are rotatably supported by the air bearings 64a to 64d under a non-contact state, rotational accuracy in any direction of thrust or radial can be increased up to about 0.05 μm, and not only a static acceleration but also a dynamic acceleration added with a frequency modulation component can be given to the sensitive parts of the acceleration transducers 12a to 12d and it is possible to measure the outputs of the acceleration transducers 12a to 12d in a wide range of frequency region and to measure (or calibrate) a characteristic in a low frequency range of 0 to 20 Hz which was impossible in the prior art with an accuracy of 0.3% or less.

Accordingly, if the third preferred embodiment of the present invention is used as the acceleration calibration device, it is possible to perform a calibration over a wide frequency range including a low frequency range at an accuracy of calibration more than 10 times as compared to the prior art comparing calibration system and further it is possible to get an accuracy in calibration less than 0.3% over about 1% in calibration accuracy of the prior art absolute system. In addition, a calibration at the frequency range of 0 to 20 Hz which was impossible in the absolute system can be accomplished at an accuracy less than 0.3 %.

A gist of the third preferred embodiment of the present invention is not limited to that described above and illustrated in the drawings and various modifications can be attained without departing from the scope of its gist.

For example, the number of the first turn-tables is not limited to four, but two, three or more than four turn-tables can be disposed. Provided that it is preferable that their arranging angles are equally spaced apart in order to keep their rotational balance (a dynamic balance).

Rotational directions of a plurality of first turn-tables may be in the same directions or opposite directions and in order to keep the dynamic balance, it is preferable that they are rotated in the opposite directions to each other.

Although as material quality of the air bearings at the fixed side and rotary side, stainless steel, ceramics, and carbonic material, aluminum or the like are used, it is preferable that the ceramics are combined to each other and a stainless steel material and a carbonic material are combined to each other so as not to make any seizure when the supplying of air is terminated.

What is claimed is:

1. A centrifugal type acceleration measuring device comprising a turn-table directly driven by a brushless motor and having an acceleration transducer mounting part for fixing a measured acceleration transducer formed at a location displaced from a rotational center thereof; an air bearing rotatably supporting the turn-table; an amplifier for individually amplifying outputs of the acceleration transducer fixed to said acceleration transducer mounting part of said turn-table; and a rotary transformer for transmitting a signal outputted from the amplifier characterized in that the rate of revolution of said brushless motor is varied to apply a predetermined acceleration to said measured acceleration transducer and the output of said measured acceleration transducer at that time is fed to the fixed side of said rotary transformer through said rotary transformer.

2. A centrifugal type acceleration measuring device comprising a turn-table directly driven by a brushless motor and having an acceleration transducer mounting part for fixing a measured acceleration transducer formed at a location displaced from a rotational center thereof; an air bearing for rotatably supporting the turn-table; signal adjusting means for at least amplifying an output of the acceleration transducer fixed to said acceleration transducer mounting part of said turn-table; a first signal processing means for converting a parallel signal outputted from the signal adjusting means into a digital serial signal, thereafter performing a modulating process on said serial signal; a rotary transformer having its rotary side rotated together with said measured acceleration transducer and for transmitting an output of said first signal processing means from the rotary side to the fixed side of said rotary transformer; and a second signal processing means for demodulating a signal transmitted to the fixed side of the rotary transformer and performing a converting process of the signal into a serial signal.

3. A centrifugal type measuring device comprising a turn-table directly driven by a brushless motor and having an acceleration transducer mounting part for fixing a measured acceleration transducer formed at a location displaced from a rotational center; an air bearing for rotatably supporting the turn-table; signal adjusting means for performing a function for receiving a detected output of the acceleration transducer fixed to said acceleration transducer mounting part of said turn-table and amplifying it, a function for outputting a calibration value signal and a function for removing a nonbalanced component in a bridge circuit or the like; a first signal processing means for converting a parallel signal having a signal outputted from the signal adjusting means into a serial digital signal, and for thereafter modulating it; a rotary transformer having its rotary side rotated together with said measured acceleration transducer and for transmitting an output of said first signal processing means from the rotary side to the fixed side of said rotary transformer; a second signal processing means for demodulating a signal transmitted to the fixed side of the rotary transformer and converting it into a serial signal; instruction signal generating means for generating an instruction signal such as said calibration value signal output instruction for controlling said signal adjusting means and a balance adjusting instruction in said bridge circuit or the like from said fixed side; a third signal processing means for converting a parallel instruction signal outputted from the instruction signal generating means into a serial signal, and thereafter modulating it; changing-over means for transmitting an output signal of said first signal processing means to said second signal processing means through said rotary transformer when said instruction signal is not generated, preventing a signal outputted from said first signal processing means from being transmitted to said second signal processing means when said instruction signal is generated, and transmitting an output of said third signal processing means from the fixed side of said rotary transformer to the rotary side; and a fourth signal processing means for demodulating an output signal of said third signal processing means transmitted from the fixed side to the rotary side of said rotary transformer, converting it into a parallel signal and outputting it to said signal adjusting means.

4. A centrifugal type acceleration comprising first turn-tables each directly connected to and rotationally driving by a first brushless motor and having an acceleration transducer mounting part for fixing a measured acceleration transducer in such a way as a center of the sensitive part of a measured acceleration transducer may become a rotational center; a first bearing for rotatably supporting each of the first turn-tables; a second turn-table directly connected to and rotationally driven by a second brushless motor and having said first turn-tables disposed thereon at locations displaced from the rotational center thereof on each said first bearing; a second bearing composed of an air bearing for rotatably supporting the second turn-table; an amplifier for individually amplifying an output of the accelerating transducer fixed to each of the acceleration transducer mounting part on said first turn-tables; a first rotary transformer for each said first turn-tables for transmitting a signal outputted from the corresponding amplifier to said second turn-table; and a second rotary transformer for transmitting a signal transmitted by each first rotary transformer from said second turn-table to the fixed part of said second rotary transformer characterized in that a predetermined acceleration is given to said first turn-tables by varying the rate of revolution of said second brushless motor, each said first brushless motor is rotated to cause the sensitive shaft of the corresponding measured acceleration transducer to be rotated around said sensitive part of such measured acceleration transducer mounted on each of said first turn-tables to apply a frequency modulating component to the output of such measured acceleration transducer, and the outputs of measured acceleration transducers are fed out in sequence through said first and second rotary transformers to the fixed side of each second rotary transformer.

* * * * *